United States Patent
Shibata

(10) Patent No.: US 8,140,417 B2
(45) Date of Patent: Mar. 20, 2012

(54) DATA TRANSMISSION SYSTEM AND DATA TRANSMITTING METHOD

(75) Inventor: Tetsuya Shibata, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 449 days.

(21) Appl. No.: 12/151,907

(22) Filed: May 9, 2008

(65) Prior Publication Data

US 2008/0281624 A1    Nov. 13, 2008

(30) Foreign Application Priority Data

May 10, 2007    (JP) ................................ 2007-125772

(51) Int. Cl.
*G06Q 40/00*    (2006.01)
(52) U.S. Cl. ............... 705/35; 705/38; 705/39; 705/40; 705/41; 705/60; 705/74; 355/53; 358/437; 358/3.28; 235/386; 194/205; 379/420; 463/42
(58) Field of Classification Search .................... 355/53; 358/437, 3.28; 235/386; 705/60, 35, 74, 705/38–41; 194/205; 379/420; 463/42; 455/414; 283/190; 348/286
See application file for complete search history.

(56) References Cited

U.S. PATENT DOCUMENTS

| | | | |
|---|---|---|---|
| 2004/0016620 A1* | 1/2004 | Davis | 194/205 |
| 2005/0073665 A1* | 4/2005 | Taniguchi et al. | 355/53 |
| 2008/0248878 A1* | 10/2008 | Yoshioka | 463/42 |

FOREIGN PATENT DOCUMENTS

| | | | |
|---|---|---|---|
| JP | 410171887 A | * | 6/1998 |
| JP | 2002-009999 | | 1/2002 |
| JP | 2004-145765 | | 5/2004 |
| JP | 2007-193606 | | 8/2007 |
| JP | 2007265256 A | * | 10/2007 |

* cited by examiner

*Primary Examiner* — Harish T Dass
(74) *Attorney, Agent, or Firm* — David G. Conlin; Steven M. Jensen; Edwards Wildman Palmer LLP

(57) ABSTRACT

A data transmission system is provided that enables a user to move away before the completion of data transmission regardless of whether a refund is made in association with occurrence of a communication error when a data transmitting apparatus performs data transmission and collects a consideration. The data transmitting apparatus includes a consideration receiving portion that receives a consideration of FAX data transmission, a report destination input portion that inputs a report destination of a user, and a FAX transmission error detecting portion that detects a communication error at the time of the FAX data transmission. In case the FAX transmission error detecting portion detects a communication error, the system including the data transmitting apparatus transmits refund information for refunding the consideration of the FAX data transmission with the communication error to the report destination input through the report destination input portion.

23 Claims, 15 Drawing Sheets

FIG. 5

WHEN ERROR OCCURS DURING FAX TRANSMISSION, DO YOU RECEIVE REPORT THROUGH E-MAIL?

⦿ RECEIVE REPORT THROUGH E-MAIL (YOU CAN RECEIVE REFUND LATER BASED ON E-MAIL)

○ NOT RECEIVE REPORT THROUGH E-MAIL (ALTHOUGH YOU CAN IMMEDIATELY RECEIVE REFUND, YOU MUST WAIT COMPLETION OF TRANSMISSION)

PLEASE INPUT MAIL ADDRESS.

aaa@bbb.ne.jp

OK

```
SINCE ERROR OCCURS DURING
TRANSMISSION, REFUND IS MADE.
PLEASE BRING ERROR SHEET TO BE
PRINTED TO STORE CLERK

COMPLETED TRANSMISSION    ○ PAGES
    REFUND AMOUNT             △△ YEN

[ OK ]
```

```
ALTHOUGH YOU REQUESTED
FAX TRANSMISSION AT 10:31,
FEB 10, 2007, TRANSMISSION
ERROR OCCURS.

PLEASE PRINT THIS E-MAIL
WITH MFP IN NEARBY STORE.
PLEASE BRING PRINTED SHEET
TO STORE CLERK FOR
SETTLEMENT.
```

| QR INFORMATION | SETTLEMENT | MONEY AMOUNT | MAIL ADDRESS | |
|---|---|---|---|---|
| 123456789··· | DONE | 180 YEN | ······· | |
| 123456789··· | NOT YET | 200 YEN | — | |
| ······· | | | | |
| | | | | |

45

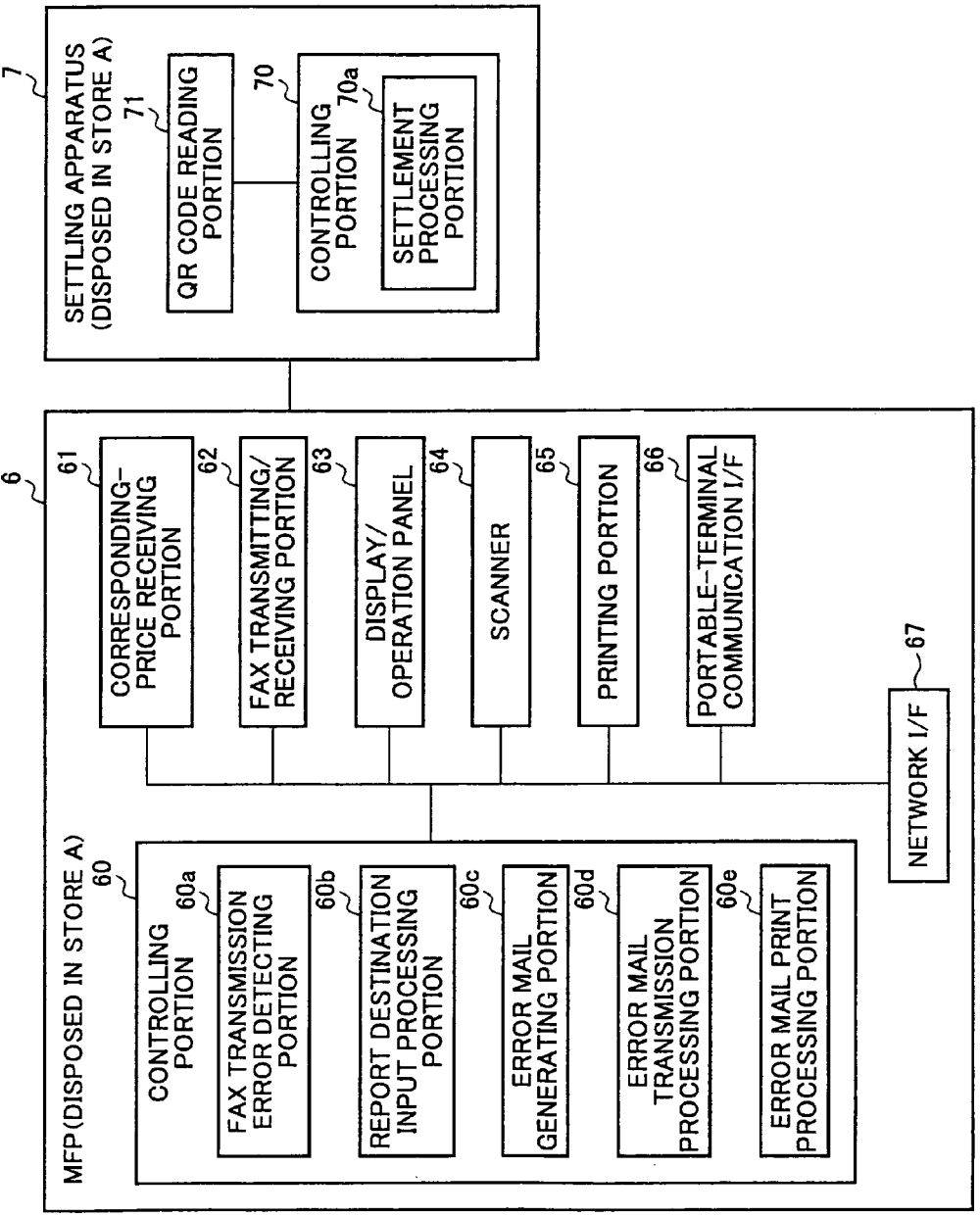

DATA TRANSMISSION SYSTEM AND DATA TRANSMITTING METHOD

CROSS-NOTING PARAGRAPH

This Non-provisional application claims priority under 35 U.S.C. §119 (a) on Patent Application No. 2007-125772 filed in JAPAN on May 10, 2007, the entire contents of which are hereby incorporated herein by reference.

FIELD OF THE INVENTION

The present invention relates generally to a data transmission system, a data transmitting apparatus, a management server apparatus, and a data transmitting method, and, more particularly, to a data transmission system that includes a data transmitting apparatus capable of data transmission such as facsimile (FAX) transmission and capable of receiving the corresponding price thereof, the data transmitting apparatus, a management server apparatus equipped in the system, and a data transmitting method using the system.

BACKGROUND OF THE INVENTION

Conventionally, the FAX service is provided in convenience stores, etc. In this FAX service, a charge (a corresponding price of transmission) is determined when the FAX transmission is completed in consideration of communication errors during FAX transmission.

To support such charge determination and to prevent omission of collection of the charge, a FAX service providing system is disclosed and utilized that cancels the charging when an error occurs during FAX transmission (e.g., see Japanese Laid-Open Patent Publication Nos. 2002-009999 and 2004-145765).

However, in conventional FAX service providing systems including the technologies described in Japanese Laid-Open Patent Publication Nos. 2002-009999 and 2004-145765, since a refund is made when a communication error occurs, a user must watch over at least whether a communication error occurs until transmission is completed and cannot move away from a disposition location of a FAX transmitting apparatus.

Especially, although documents can be removed after the documents are read in the case of a large amount of FAX transmission, a user cannot move away from a disposition location of a FAX transmitting apparatus until the completion of the FAX transmission when the charge is determined.

Such a problem may occur not only at the time of normal FAX transmission but also at the time of e-mail transmission and FTP (file transfer protocol) transmission after scanning documents as well as at the time of internet FAX transmission and IP (internet protocol) FAX transmission.

SUMMARY OF THE INVENTION

The present invention was conceived in view of the above situations and it is therefore the object of the present invention to provide a data transmission system that enables a user to move away before the completion of data transmission regardless of whether a refund is made in association with occurrence of a communication error when a data transmitting apparatus performs data transmission and collects a corresponding price, the data transmitting apparatus included in the system, a management server apparatus included in the system, and a data transmitting method using the system.

In order to solve the above problems, a first technical means of the present invention is a data transmission system comprising a data transmitting apparatus including a data transmitting portion that transmits data, the data transmitting apparatus including a consideration receiving portion that receives a consideration of data transmission by the data transmitting portion, a report destination input portion that inputs a report destination, and an error detecting portion that detects a communication error at the time of the data transmission by the data transmitting portion, the data transmission system including a refund information transmitting portion that transmits refund information for refunding a consideration of data transmission with the communication error to the report destination input by the report destination input portion in case the communication error is detected by the error detecting portion.

A second technical means is the data transmission system as defined in the first technical means, comprising a management server apparatus connected to the data transmitting apparatus through a network, wherein the refund information transmitting portion includes on the data transmitting apparatus side a transmission information transmitting portion that transmits to the management server apparatus transmission information including the report destination input by the report destination input portion and the consideration of data transmission received by the consideration receiving portion and includes on the management server apparatus side a transmission information receiving portion that receives the transmission information and a transmitting portion that transmits refund information for refunding the consideration of data transmission with the communication error to the report destination included in the transmission information received by the transmission information receiving portion.

A third technical means is the data transmission system as defined in the second technical means, wherein the data transmitting apparatus includes a refund information input portion that inputs refund information transmitted by the refund information transmitting portion or information including the refund information; and a settling portion that executes a settlement process of a money amount indicated by the refund information input by the refund information input portion.

A fourth technical means is the data transmission system as defined in the third technical means, wherein the settling portion includes a refund validity checking portion that transmits to the management server apparatus a check request for checking whether the refund information input by the refund information input portion is information that should cause a refund, or a check request for said check and for checking a money amount indicated by the refund information, to acquire result thereof and executes the settlement process based on the result only when a refund should be made, and wherein the management server apparatus includes a refund managing portion that manages refund information of uncompleted refund based on the transmission information received by the transmission information receiving portion and the refund information included in the check request from the refund validity checking portion; and a check result returning portion that checks whether information should cause a refund based on whether the refund information included in the check request from the refund validity checking portion is the refund information of uncompleted refund managed by the refund managing portion, or that checks a money amount indicated by the refund information included in the check request in addition to said check, to return the result thereof to the data transmitting apparatus.

A fifth technical means is the data transmission system as defined in the fourth technical means, wherein the data transmitting apparatus includes a refund completion reporting portion that transmits to the management server apparatus a refund completion report for refund information of a settlement process completed by the settling portion, and wherein the refund managing portion receives the refund completion report transmitted by the refund completion reporting portion to manage the refund information of uncompleted refund based on the transmission information and the refund completion report instead of the transmission information and the refund information included in the check request.

A sixth technical means is the data transmission system as defined in the first technical means, comprising a management server apparatus connected to the data transmitting apparatus through a network, wherein the refund information transmitting portion is on the data transmitting apparatus side, and wherein the data transmitting apparatus includes a refund information input portion that inputs refund information transmitted by the refund information transmitting portion or information including the refund information; and a settling portion that executes a settlement process of a money amount indicated by the refund information input by the refund information input portion.

A seventh technical means is the data transmission system as defined in the sixth technical means, wherein the data transmitting apparatus includes a management refund information transmitting portion that transmits to the management server apparatus management refund information including the refund information transmitted by the refund information transmitting portion, wherein the settling portion includes a refund validity checking portion that transmits to the management server apparatus a check request for checking whether the refund information input by the refund information input portion is information that should cause a refund, or a check request for said check and for checking a money amount indicated by the refund information, to acquire result thereof and executes the settlement process based on the result only when a refund should be made, and wherein the management server apparatus includes a refund managing portion that receives the management refund information transmitted by the management refund information transmitting portion to manage refund information of uncompleted refund based on the management refund information and the refund information included in the check request from the refund validity checking portion; and a check result returning portion that checks whether information should cause a refund based on whether the refund information included in the check request from the refund validity checking portion is the refund information of uncompleted refund managed by the refund managing portion, or that checks a money amount indicated by the refund information included in the check request in addition to said check, to return the result thereof to the data transmitting apparatus.

An eighth technical means is the data transmission system as defined in the seventh technical means, wherein the data transmitting apparatus includes a refund completion reporting portion that transmits to the management server apparatus a refund completion report for refund information of a settlement process completed by the settling portion, and wherein the refund managing portion receives the refund completion report transmitted by the refund completion reporting portion to manage the refund information of uncompleted refund based on the management refund information and the refund completion report instead of the management refund information and the refund information included in the check request.

A ninth technical means is the data transmission system as defined in the seventh technical means, wherein the refund information transmitted by the refund information transmitting portion includes apparatus identification information that identifies the data transmitting apparatus, and wherein based on the apparatus identification information, the refund validity checking portion transmits the check request to the management server apparatus only when the refund information input by the refund information input portion is generated due to a communication error of another data transmitting apparatus.

A tenth technical means is the data transmission system as defined in the third technical means, wherein the refund information input portion includes an image reading portion that optically reads an image on a sheet having printed thereon the refund information transmitted by the refund information transmitting portion.

An eleventh technical means is the data transmission system as defined in the third technical means, wherein the consideration receiving portion includes a money input/output apparatus inputting money and outputting money of a change if the input money amount exceeds the consideration, and wherein the settling portion includes a refunding portion using this money input/output apparatus to output money of an amount indicated by the refund information.

A twelfth technical means is the data transmission system as defined in the third technical means, wherein the settling portion transmits an instruction for a settlement process of a money amount indicated by the refund information to a cash register apparatus connected to the data transmitting apparatus and disposed in the vicinity thereof.

A thirteenth technical means is the data transmission system as defined in the second technical means, comprising a cash register apparatus connected to the management server apparatus and disposed in the vicinity of the data transmitting apparatus, wherein the cash register apparatus includes a refund information input portion that inputs refund information transmitted by the refund information transmitting portion or information including the refund information; and a settling portion that executes a settlement process of a money amount indicated by the refund information input by the refund information input portion, wherein the settling portion includes a refund validity checking portion that transmits to the management server apparatus a check request for checking whether the refund information input by the refund information input portion is information that should cause a refund, or a check request for said check and for checking a money amount indicated by the refund information, to acquire result thereof and executes the settlement process based on the result only when a refund should be made, and wherein the management server apparatus includes a refund managing portion that manages refund information of uncompleted refund based on the transmission information received by the transmission information receiving portion and the refund information included in the check request from the refund validity checking portion; and a check result returning portion that checks whether information should cause a refund based on whether the refund information included in the check request from the refund validity checking portion is the refund information of uncompleted refund managed by the refund managing portion, or that checks a money amount indicated by the refund information included in the check request in addition to said check, to return the result thereof to the cash register apparatus.

A fourteenth technical means is the data transmission system as defined in the thirteenth technical means, wherein the cash register apparatus includes a refund completion reporting portion that transmits to the management server apparatus a refund completion report for refund information of a settlement process completed by the settling portion, and wherein the refund managing portion receives the refund completion report transmitted by the refund completion reporting portion to manage the refund information of uncompleted refund based on the transmission information and the refund completion report instead of the transmission information and the refund information included in the check request.

A fifteenth technical means is the data transmission system as defined in the first technical means, comprising a management server apparatus connected to the data transmitting apparatus through a network and a cash register apparatus connected to the management server apparatus through a network and disposed in the vicinity of the data transmitting apparatus, wherein the refund information transmitting portion is on the data transmitting apparatus side, wherein the data transmitting apparatus includes a management refund information transmitting portion that transmits to the management server apparatus the management refund information including the refund information transmitted by the refund information transmitting portion, wherein the cash register apparatus includes a refund information input portion that inputs refund information transmitted by the refund information transmitting portion or information including the refund information; and a settling portion that executes a settlement process of a money amount indicated by the refund information input by the refund information input portion, wherein the settling portion includes a refund validity checking portion that transmits to the management server apparatus a check request for checking whether the refund information input by the refund information input portion is information that should cause a refund, or a check request for said check and for checking a money amount indicated by the refund information, to acquire result thereof and executes the settlement process based on the result only when a refund should be made, and wherein the management server apparatus includes a refund managing portion that receives management refund information transmitted by the management refund information transmitting portion to manage refund information of uncompleted refund based on the management refund information and the refund information included in the check request from the refund validity checking portion; and a check result returning portion that checks whether information should cause a refund based on whether the refund information included in the check request from the refund validity checking portion is the refund information of uncompleted refund managed by the refund managing portion, or that checks a money amount indicated by the refund information included in the check request in addition to said check, to return the result thereof to the cash register apparatus.

A sixteenth technical means is the data transmission system as defined in the fifteenth technical means, wherein the cash register apparatus includes a refund completion reporting portion that transmits to the management server apparatus a refund completion report for refund information of a settlement process completed by the settling portion, and wherein the refund managing portion receives the refund completion report transmitted by the refund completion reporting portion to manage the refund information of uncompleted refund based on the management refund information and the refund completion report instead of the management refund information and the refund information included in the check request.

A seventeenth technical means is the data transmission system as defined in the first technical means, wherein the data transmitting apparatus includes a report destination erasing portion that erases the report destination input by the report destination input portion when the data transmission of the data transmitting portion is completed without a communication error detected by the error detecting portion and when the refund information transmitting portion completes the transmission of the refund information after the error detecting portion detects a communication error.

An eighteenth technical means is the data transmission system as defined in the first technical means, wherein the report destination is an e-mail address and wherein the refund information transmitting portion transmits the refund information to the report destination through an e-mail.

A nineteenth technical means is the data transmission system as defined in the first technical means, wherein the refund information transmitting portion transmits the refund information as a one-dimensional or two-dimensional code to the report destination.

A twentieth technical means is the data transmission system as defined in the first technical means, wherein the refund information transmitting portion is on the data transmitting apparatus side and wherein the data transmitting apparatus includes a refund information input portion that inputs refund information transmitted by the refund information transmitting portion or information including the refund information; and a settling portion that executes a settlement process of a money amount indicated by the refund information input by the refund information input portion.

A twenty-first technical means is the data transmitting apparatus in the data transmission system as defined in any one of the first to the nineteenth technical means.

A twenty-second technical means is the management server apparatus in the data transmission system as defined in any one of the first to the nineteenth technical means.

A twenty-third technical means is a data transmitting method using a data transmitting apparatus capable of data transmission and capable of receiving a consideration of the data transmission, comprising: a report destination input step of accepting input of a report destination by the data transmitting apparatus; an error detecting step of detecting a communication error by the data transmitting apparatus at the time of the data transmission; and a refund information transmitting step of transmitting refund information for refunding a consideration of data transmission with the communication error to the report destination input at the report destination input step in case the communication error is detected at the error detecting step.

A twenty-fourth technical means is the data transmitting method as defined in the twenty-third technical means, wherein the refund information transmitting step includes a transmission information transmitting step of transmitting by the data transmitting apparatus to a management server apparatus connected through a network to the data transmitting apparatus transmission information including a report destination input at the report destination input step and the received consideration of data transmission in case a communication error is detected at the error detecting step; a transmission information receiving step of receiving the transmission information with the management server apparatus; and a transmitting step of transmitting by the management server apparatus the refund information for refunding the consideration of data transmission with the communication error to the report destination included in the transmission information received at the transmission information receiving step.

A twenty-fifth technical means is the data transmitting method as defined in the twenty-fourth technical means, comprising a refund information input step of inputting by the data transmitting apparatus the refund information transmitted at the refund information transmitting step or information including the refund information; and a settling step of executing by the data transmitting apparatus a settlement process of a money amount indicated by the refund information input at the refund information input step.

BRIEF DESCRIPTION OF THE DRAWINGS

FIG. 5 depicts an example of UI displayed on a display/operation panel of the MFP in the process of FIG. 2;

FIG. 6 depicts an example of UI displayed on the display/operation panel of the MFP in the process of FIG. 2;

FIG. 13 depicts an exemplary configuration of the FAX transmission system according to another embodiment of the present invention;

PREFERRED EMBODIMENTS OF THE INVENTION

Figure 1:
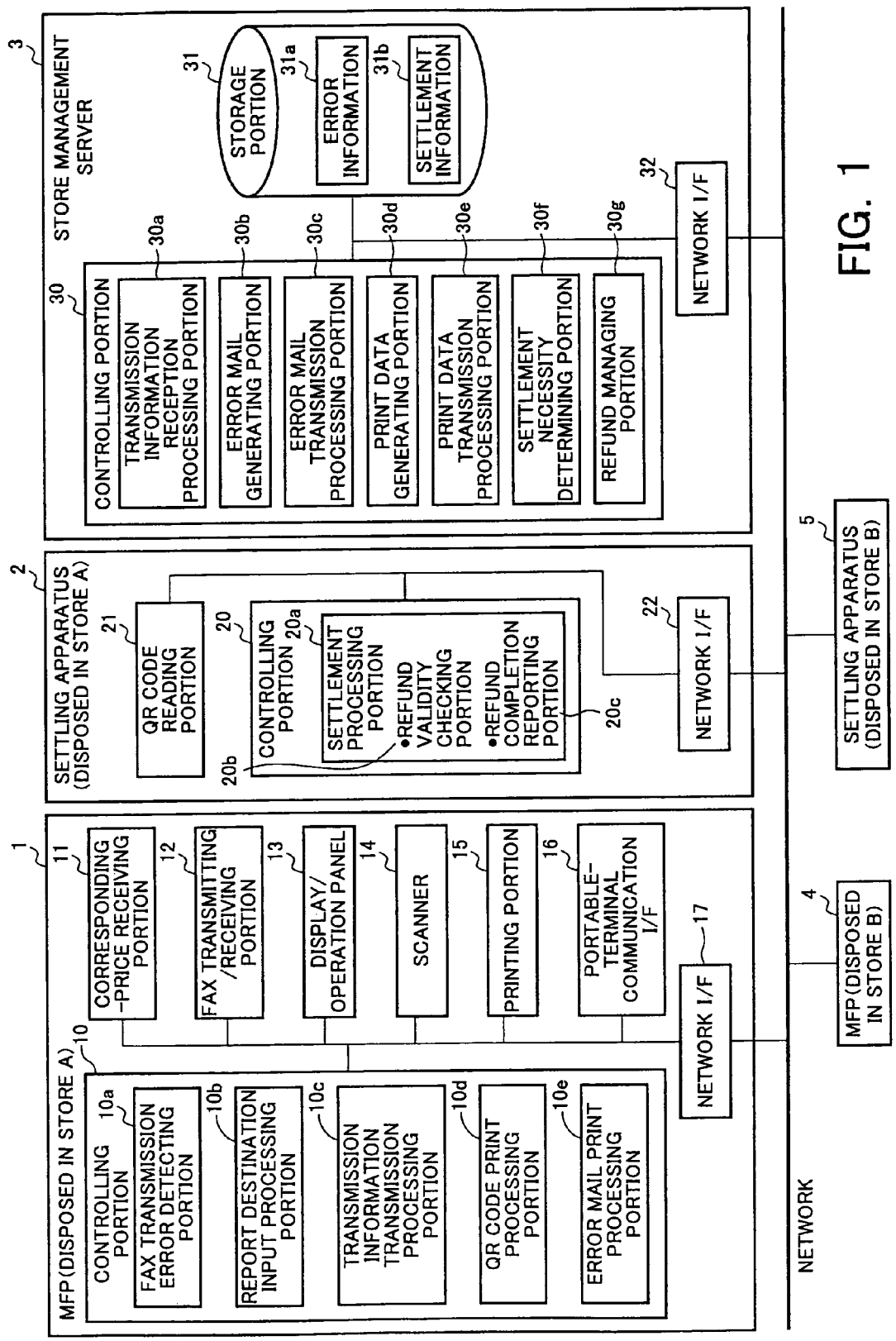
FIG. 1 depicts an exemplary configuration of a FAX transmission system according to one embodiment of the present invention.

A data transmission system (hereinafter, the system) according to the present invention is a system equipped with a data transmitting apparatus including a data transmitting portion that transmits data and a corresponding-price receiving portion that receives (collects) a consideration (corresponding price) of the data transmission by the data transmitting portion and is a charging system for providing a service of transmitting desired data to a user. This data transmitting apparatus has an error detecting portion that detects (determines) a communication error at the time of the data transmission by the data transmitting portion.

The system is mainly characterized by providing on the data transmitting apparatus a report destination input portion that inputs a report destination at the time of occurrence of a communication error and by including a refund information transmitting portion that transmits refund information for refunding (returning) a corresponding price of data transmission with a communication error to the report destination input by the report destination input portion if the communication error is detected by the error detecting portion. This refund information transmitting portion may be implemented in a distribution manner such that the data transmitting apparatus and a management server apparatus described later cooperate with each other through a network to transmit the refund information or may be implemented on the data transmitting apparatus as exemplarily illustrated below.

In the system, because of such characteristics, when a user pays a corresponding price to perform data transmission in a store such as a convenience store, the user can move away without waiting the completion of the transmission (regardless of whether a refund is made due to occurrence of a communication error). For example, after the reading of a document is completed, when a document becomes removable, the user can move away from a disposition location of a data transmitting apparatus without caring whether a refund is made (i.e., whether a communication error occurs). This is particularly useful when the data transmission is performed for a large amount of documents through FAX transmission, etc.

A user does not have to wait the completion of transmission because the refund information is reported to a report destination specified by the user even when an error occurs during data transmission. From the standpoint of the user, this is because the user has a sense of security that the refund can be obtained by presenting the refund information to the store or an affiliated store or through a settlement method using the refund information described later.

In the following description, an example of a data transmitting portion will be a FAX transmitting portion that performs the FAX transmission of image data acquired by optically reading (scanning) a document placed by a user through the telephone lines or ISDN (Integrated Services Digital Network) lines. For example, the FTP transmission, the e-mail transmission (so-called internet FAX transmission), and the IP (internet protocol) FAX transmission can also be applied to the image data after scanning the document instead of the FAX transmission. The e-mail transmission, the FTP transmission, etc., may also be applied to a file such as a document file read from arbitrary storage medium such as a USB (Universal Serial Bus) memory, for example.

Although a multi-function peripheral (MFP) including functions such as a print function and a scanner function in addition to the FAX transmission function is taken as an example of a data transmitting apparatus in the following description, other apparatuses such as a FAX apparatus can also be applied.

It is preferable that the report destination input by the user through the report destination input portion is an e-mail address. In this case, the refund information transmitting portion transmits the refund information through an e-mail to the address specified by the user. Therefore, an e-mail including the refund information can be received by a device used by the user, for example, a portable terminal, such as a portable telephone and a personal digital assistant (PDA), or a personal computer (PC). Among these devices, a portable terminal is taken as an example of the device used by the user in the following description. Although an e-mail address will hereinafter be described as a report destination, other report destinations such as a user's home FAX number may also be employed.

Although the refund information is information for refunding the corresponding price and will hereinafter be described as information of a money amount for direct refund, the information may be information of a retransmission credit ticket for indirect refund. It is preferable that the refund information transmitting portion transmits a one-dimensional code such as a bar-code or a two-dimensional code such as a QR code as the refund information to the report destination. Even in the form of not transmitting a one-dimensional code or two-dimensional code, if a code generation program is incorporated into a device of the report destination, the user can acquire the code with the device. The device of the report destination in this case is a device that receives an e-mail to the address specified by the user. Although the refund information is transmitted as a QR code to the report destination in the example of the following description, other types of information are also applicable.

FIG. 1 depicts an exemplary configuration of a FAX transmission system according to one embodiment of the present invention, and in FIG. 1, a reference numeral 1 denotes an MFP disposed in a store A; 2 denotes a settling apparatus disposed in the store A; 3 denotes a management server apparatus (hereinafter, simply, a server); 4 denotes an MFP disposed in a store B that is an affiliated store of the store A; and 5 denotes a settling apparatus disposed in the store B. In FIG. 1, the MFPs 1, 4 are located in affiliated stores such as convenience stores and the settling apparatuses 2, 5 are located in the respective stores.

The MFP 1 shown in FIG. 1 includes a controlling portion 10 that controls the MFP 1 as a whole, a corresponding-price receiving portion (corresponding-price collecting portion) 11, a FAX transmitting/receiving portion 12, a display/operation panel 13, a scanner portion 14, a printing portion 15, a portable-terminal communication I/F 16, and a network interface (I/F) 17. The MFP 4 has the same configuration as the MFP 1.

The controlling portion 10 includes a FAX transmission error detecting portion (FAX transmission error determining portion) 10a described later, a report destination input processing portion 10b, a transmission information transmission processing portion 10c, a QR code print processing portion 10d, and an error mail print processing portion 10e and performs the FAX transmission control including the control at the time of communication error according to the present invention.

For example, the controlling portion 10 includes hardware such as a CPU, a ROM for a program storage area, and a RAM for a work area, and a predetermined control program for causing the hardware to implement the functions of the controlling portion 10 (including the functions of the portions 10a to 10e) may be stored in the ROM or a hard disc. As a result, the predetermined control program stored in the ROM, etc., can be read and executed on the RAM by the CPU to implement the functions of the controlling portion 10 including the functions of the portions 10a to 10e. The predetermined control program is firmware for the MFP 1.

The settling apparatus 2 includes a controlling portion 20, a QR code reading portion 21, and a network I/F 22. The settling apparatus 4 has the same configuration as the settling apparatus 2. The controlling portion 20 controls the settling apparatus 2 as a whole. The controlling portion 20 includes a settlement processing portion 20a having a refund validity checking portion 20b and a refund completion reporting portion 20c and controls a settlement process (refund process) associated with the occurrence of a communication error according to the present invention.

For example, the controlling portion 20 includes hardware such as a CPU, a ROM, and a RAM as is the case with the controlling portion 10 of the MFP 1, and a predetermined control program for causing the hardware to implement the functions of the controlling portion 20 (including the function of the settlement processing portion 20a) may be stored in the ROM or a hard disc. As a result, the predetermined control program stored in the ROM, etc., can be read and executed on the RAM by the CPU to implement the functions of the controlling portion 20 including the functions of the settlement processing portion 20a. The predetermined control program is firmware for the settling apparatus 2.

Although the settling apparatus 2 may be made up of a cash register apparatus disposed in the store and such a configuration will be taken as an example in the description, the settling apparatus 2 may be built into the MFP 1 as described later. In the example of the settling apparatus 2 made up of a cash register apparatus, the settling apparatus 2 is connected to a server 3 and disposed in the vicinity of the MFP 1.

The server 3 includes a controlling portion 30 that controls the server 3 as a whole, a storage portion 31, and a network I/F 32. To perform the control at the time of communication error according to the present invention, the controlling portion 30 includes a transmission information reception processing portion 30a, an error mail generating portion 30b, an error mail transmission processing portion 30c, a print data (printing data) generating portion 30d, a print data transmission processing portion 30e, a settlement necessity determining portion 30f, and a refund managing portion 30g.

The controlling portion 30 can be made up of a computer and a server program incorporated into the computer to implement the functions of the controlling portion 30. For example, hardware such as a CPU, a ROM, a RAM, and a hard disc is included, and a predetermined control program (server program) for causing the hardware to implement the functions of the controlling portion 30 (including the functions of the portions 30a to 30g) may be stored in the ROM or a hard disc making up the storage portion 31. As a result, the server program stored in the ROM, etc., can be read and executed on the RAM by the CPU to implement the functions of the controlling portion 30 including the functions of the portions 30a to 30g.

The server 3 is a store management server for managing a refund at the time of FAX transmission error in affiliated stores (in this case, the stores A and B) and may be built into a server for managing the account processes of the stores, for example. It is preferable that the server 3 is disposed on a location where a plurality of stores is collectively managed. On the contrary, if the server 3 is disposed in each store, the servers are connected through a network and the refund information, etc., are shared to enable a user to receive a refund through a settlement process described later in any sharing stores.

The portions in the system having the above configuration will then be described in detail.

The FAX transmitting/receiving portion 12 performs the FAX transmission (or FAX reception) of a document specified by the user in accordance with instructions from the user. The path of the FAX transmission/reception shown here is a path through telephone lines (not shown) and is different from a path through the network I/F 17. The FAX transmitting/receiving portion 12 transmits image data read by the scanner 14 at the time of the FAX transmission and instructs and drives the printing portion 15 to print the received FAX data at the time of the FAX reception.

The scanner 14 is an apparatus that optically reads a document to generate image data at the time of the FAX transmission or other processes. The printing portion 15 executes printing based on the print instructions from the FAX transmitting/receiving portion 12 and other print instructions.

The corresponding-price receiving portion 11 may be made up of, for example, a money input/output apparatus connected to the MFP 1. In this case, the FAX transmitting/receiving portion 12 may be controlled to receive an input (insert) money amount from the money input/output apparatus such that a process within the input money amount can be performed. Although not shown, the money input/output apparatus is made up of a money input port, a money recognizing portion, a change calculating portion, a refund processing portion, a refund port, etc., inputs money (coins or paper money), and outputs money of a change if the input money amount exceeds a corresponding price of the FAX transmission (or FAX reception) in the FAX transmitting/receiving portion 12. The money input/output apparatus is referred to as a money input machine, a currency input machine, or a coin vendor.

The above report destination input portion can be made up of the following report destination input processing portion 10b and any one of the display/operation panel 13, the portable-terminal communication I/F 16, and the network I/F 17. The report destination input processing portion 10b executes a process of setting an error mail transmission address before executing the FAX transmission. The effort of report destination input through the MFP 1 can be saved by using the portable-terminal communication I/F 16 or the network I/F 17.

The display/operation panel 13 consists of an operating portion and a displaying portion used for the transmission setting such as input of transmission destination (the other party) necessary for the FAX transmission as well as the input of the report destination. The display/operation panel 13 may be made up of hardware keys and the displaying portion or may be made up of a touch panel with the operating portion consisting of software keys only or software keys and hardware keys. When the display/operation panel 13 is used to input the report destination, the report destination input processing portion 10b displays a screen for inputting the report destination on the display/operation panel 13 to facilitate the input of the report destination and to accept a desired report destination from a user.

The portable-terminal communication I/F 16 consists of, for example, an infra-red communication I/F or other radio communication I/F and accepts the input of the report destination through communication from a portable terminal. When the communication I/F 16 is used to input the report destination, the report destination input processing portion 10b establishes communication with a portable terminal through the communication I/F 16 and acquires the desired report destination specified by a user (normally, an e-mail address of the portable terminal). Instead of this communication I/F 16, a reading apparatus may be employed for a portable recording medium writable by the portable terminal.

The network I/F 17 is an I/F for communication through a network such as LAN and WAN. When the network I/F 17 is used to input the report destination, the report destination input processing portion 10b acquires the user's desired report destination transmitted from a PC, etc., used by the user at home through the network I/F 17. In this case, to support the report destinations transmitted to the MFP 1 by a plurality of users, a transmitted report destination may be selected on the display/operation panel 13 by a user.

The FAX transmission error detecting portion 10a performs determination of general FAX transmission errors to recognize communication errors such as that the transmission destination does not respond due to power-off during FAX transmission of the FAX transmitting/receiving portion 12.

The above refund information transmitting portion can be made up of a transmission information transmitting portion of the MFP 1 and a transmission information receiving portion and a transmitting portion of the server 3 described below. The transmission information transmitting portion can exemplarily be illustrated by the transmission information transmission processing portion 10c and the network I/F 17. The transmission information receiving portion can exemplarily be illustrated by the transmission information reception processing portion 30a, the storage portion 31, and the network I/F 32, and the transmitting portion can exemplarily be illustrated by the error mail generating portion 30b, the error mail transmission processing portion 30c, the storage portion 31, and the network I/F 32.

If the FAX transmission error detecting portion 10a detects a communication error, the transmission information transmission processing portion 10c transmits to the server 3 through the network I/F 17 the transmission information including the input report destination (in this case, a user-specified mail address of the portable terminal) and the corresponding price of the FAX transmission received by the corresponding-price receiving portion 11. The corresponding price of the data transmission received by the corresponding-price receiving portion 11 can be information directly indicating a money amount or information of the number of sheets that cannot be transmitted if a price per sheet is defined. Even if the transmission is partially completed, the total number of sheets may be transmitted as the information of the number of sheets that cannot be transmitted. The transmission information may include information such as a time when the failed transmission was attempted.

In the above transmission information receiving portion, the transmission information reception processing portion 30a receives the transmission information transmitted from the MFP 1 or the MFP 4 through the network I/F 32 and stores the transmission information as error information 31a in the storage portion 31 along with, for example, information identifying the MFP with the error generated.

In the transmitting portion, a QR code for refunding the corresponding price of the data transmission with the communication error is transmitted to the report destination included in the transmission information received by the transmission information reception processing portion 30a. More specifically, the error mail generating portion 30b first reads the error information 31a in the storage portion 31 to generate an error-reporting e-mail (error mail) including the QR code. The error mail transmission processing portion 30c then transmits the error mail to the address included in the error information 31a through the network I/F 32. This error mail may include not only the QR code but also a fixed phrase described to indicate that a communication error occurs or that the QR code can be used for a refund.

On the other hand, when receiving the report (i.e., the error mail including the QR code) transmitted from the server 3, the user uses the QR code to execute a refund process. To execute the refund process using the QR code, the settling apparatus 2 may be provided with a refund information input portion and a settling portion described later. The portions will be described on the premise that the settling apparatus 2 is a cash register apparatus as described above.

The refund information input portion inputs the transmitted QR code or the information including the QR code and the settling portion executes a settlement process for a money amount indicated by the QR code input through the refund information input portion. In the example of FIG. 1, the refund information input portion and the settling portion are exemplarily illustrated by the QR code reading portion 21 and the settlement processing portion 20a, respectively.

The QR code reading portion 21 optically reads an image of a QR code or an image of information including the QR code printed by a user, analyzes the QR code to extract information indicated by the image, and delivers the information to the settlement processing portion 20a. The QR code reading portion 21 can also be implemented by two-dimensionally improving a bar-code reading apparatus of another product. To enable this input, the user must display with the portable terminal or print the QR code. In other cases, the QR code reading portion 21 may transfer and input the QR code directly or through the MFP 1 from the portable terminal into the settling apparatus 2.

In the case of the display on the portable terminal, the error mail only needs to be read and displayed, and the QR code can be read by holding the QR code part over the QR code reading portion 21. The printing may be performed by a user's home printer or may be performed by the MFP 1. The printing by the MFP 1 can be performed when the scanner 14 is disposed on the MFP 1 along with the printing portion 15, and the QR code may be scanned while the QR code is displayed on the portable terminal. Alternatively, the MFP 1 may be provided with the printing portion 15, the portable-terminal communication I/F 16, and the error mail print processing portion 10e, and the error mail print processing portion 10e may receive an e-mail existing in the portable terminal of the user through the communication I/F 16 to execute a process of driving the printing portion 15 to print the e-mail.

The actual refund itself in the settlement processing portion 20a may be performed with a money-amount displaying portion, a money storage device, etc., (not shown) equipped on the cash register apparatus and, for example, a store clerk may check a money amount displayed on the money-amount displaying portion and open the money storage device to give the money to the user.

To prevent a refund for a counterfeit QR code, it is desirable that the settling apparatus 2 checks whether a QR code is legitimate. Therefore, the settlement processing portion 20a may include the refund validity checking portion 20b that checks a QR code with the server 3. To respond to the refund validity checking portion 20b, the server 3 may be provided with the refund managing portion 30g and a check result returning portion (exemplarily illustrated as the settlement necessity determining portion 30f).

The refund validity checking portion 20b transmits through the network I/F 22 to the server 3 a check request for checking whether the QR code input through the QR code reading portion 21 is information that should cause a refund (and a check request for checking a money amount indicated by the QR code) and acquires the result thereof. The refund validity checking portion 20b may transmit the QR code itself to the server 3 or may transmit the check request after extracting from the QR code the information indicated by the QR code. The settlement processing portion 20a may execute a settlement process based on the result acquired by the refund validity checking portion 20b only when the refund should be performed.

The refund managing portion 30g of the server 3 manages a QR code of unfinished refund based on the transmission information received by the transmission information reception processing portion 30a and the QR code included in the check request from the refund validity checking portion 20b.

For example, when the transmission information reception processing portion 30a stores the error information 31a, the refund managing portion 30g also stores settlement information 31b indicating whether the settlement is completed in correlation with the error information 31a in the storage portion 31. The information stored at this point is the settlement information 31b for the new error information 31a and information indicating an unsettled refund. On the other hand, the QR code included in the check request from the refund validity checking portion 20b is set to indicate a completed refund when the check is made. Therefore, the settlement information 31b is searched at the time of the check request and if the QR code included in the check request is stored as an unsettled refund in the settlement information 31b, the information may be rewritten to indicated a settled refund or the settlement information 31b itself may be erased.

The settlement processing portion 20a of the settling apparatus 2 may be provided with the refund completion reporting portion 20c. The refund completion reporting portion 20c transmits to the server 3 through the network I/F 22 the refund completion report for the refund information of the settlement process completed in the settlement processing portion 20a. The refund managing portion 30g of the server 3 may receive the refund completion report transmitted by the refund completion reporting portion 20c to manage the QR code of uncompleted refund based on the transmission information and the refund completion report instead of the transmission information and the QR code included in the check request. For example, when receiving the refund completion report, the server 3 may retrieve the settlement information 31b to rewrite the settlement information 31b related to the report as settled refund or to erase the settlement information 31b itself.

The settlement necessity determining portion 30f checks whether a refund should be made for the information based on whether the QR code included in the check request from the refund validity checking portion 20b is the QR code of uncompleted refund managed in the refund managing portion 30g and returns the result to the settling apparatus 2. More specifically, the settlement necessity determining portion 30f reads the settlement information 31b corresponding to the check request to check whether settlement is not finished and returns the result to the settling apparatus 2. If the check of a money amount indicated by the QR code is also requested, the settlement necessity determining portion 30f may also check the money amount and return the result to the settling apparatus 2 as well. For example, in such a case that a completely irrelevant QR code or a QR code used in other affiliated stores is transmitted, a refund cannot be performed since the settlement information 31b does not exist, and the response may be information indicating zero yen, etc., or may indicate that the corresponding settlement information does not exist.

Since the refund validity checking portion 20b, the refund managing portion 30g, and the settlement necessity determining portion 30f are provided, the information of a QR code generated due to a communication error in the MFP 1 does not need to be stored in the MFP 1 or the settling apparatus 2 connected thereto, and even if a QR code is input that is generated due to a communication error in an MFP other than the MFP 1 such as the MFP 4, the settlement process can be executed with the settlement processing portion 20a.

Although the descriptions has been made on the premise that a user always specifies a QR code with an e-mail address to perform the FAX transmission, it is desirable to support the case that a user does not desire to transmit an error mail to the portable terminal. Therefore, on-site print out of a QR code may be enabled in the case of an occurrence of an error. More specifically, the MFP 1 may be provided with the QR code print processing portion 10d described below.

If a user does not desire to transmit the error mail and sets to wait the completion of the transmission on site, when the FAX transmission error detecting portion 10a detects a communication error, the QR code print processing portion 10d transmits the information of the number of sheets associated with the generated communication error (the number of sheets that should cause a refund) or the information of the corresponding price to the server 3 through the network I/F 17 and requests a QR code corresponding to the communication error. The server 3 may be provided with the print data generating portion 30d and the print data transmission processing portion 30e. The print data generating portion 30d generates print data including the QR code based on the information sent from the MFP 1, and the print data transmission processing portion 30e transmits the print data to the MFP 1 through the network I/F 32. The QR code print processing portion 10d acquires the QR code and drives the printing portion 15 to print the QR code. The user can receive the refund by bring the QR code printed out by the printing portion 15 to the settling apparatus 2.

Figure 2:
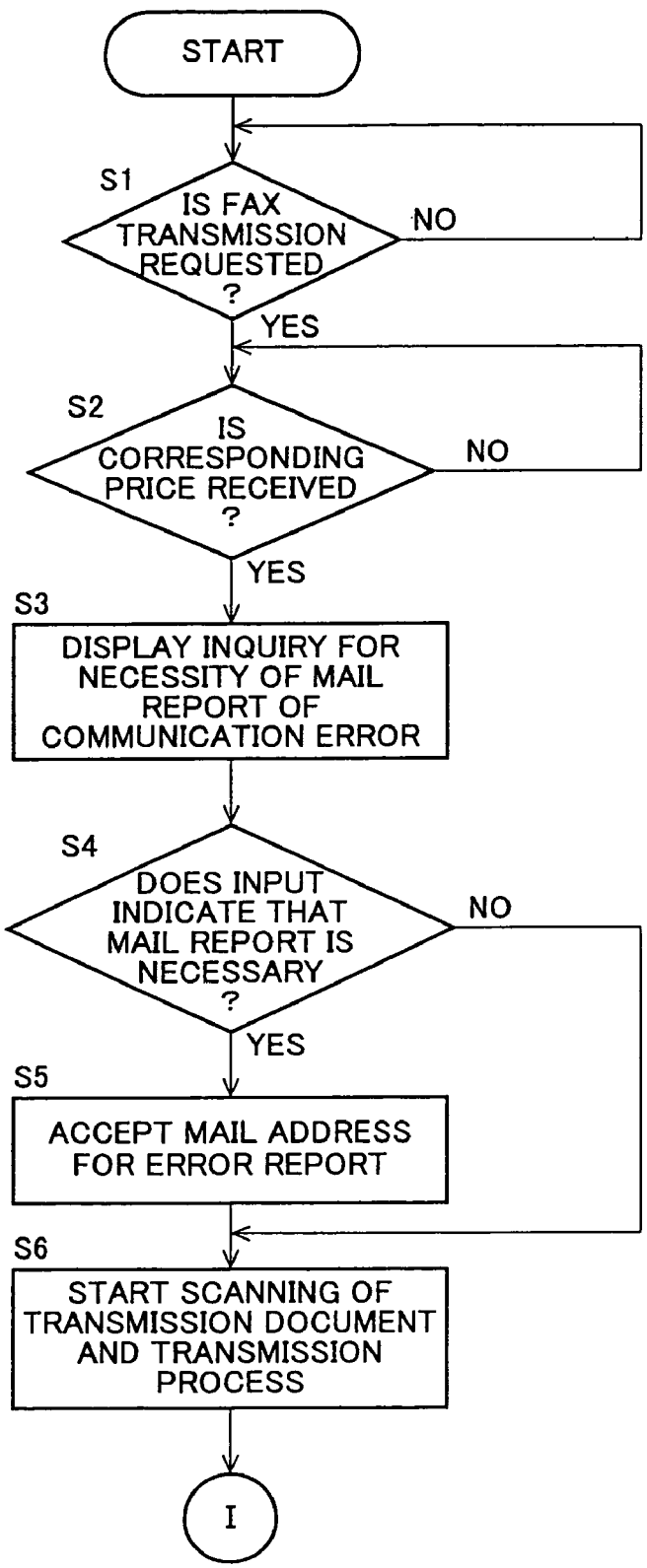
FIG. 2 is a flowchart of an example of a FAX transmission process executed by MFP of the system of FIG. 1.
Figure 3:
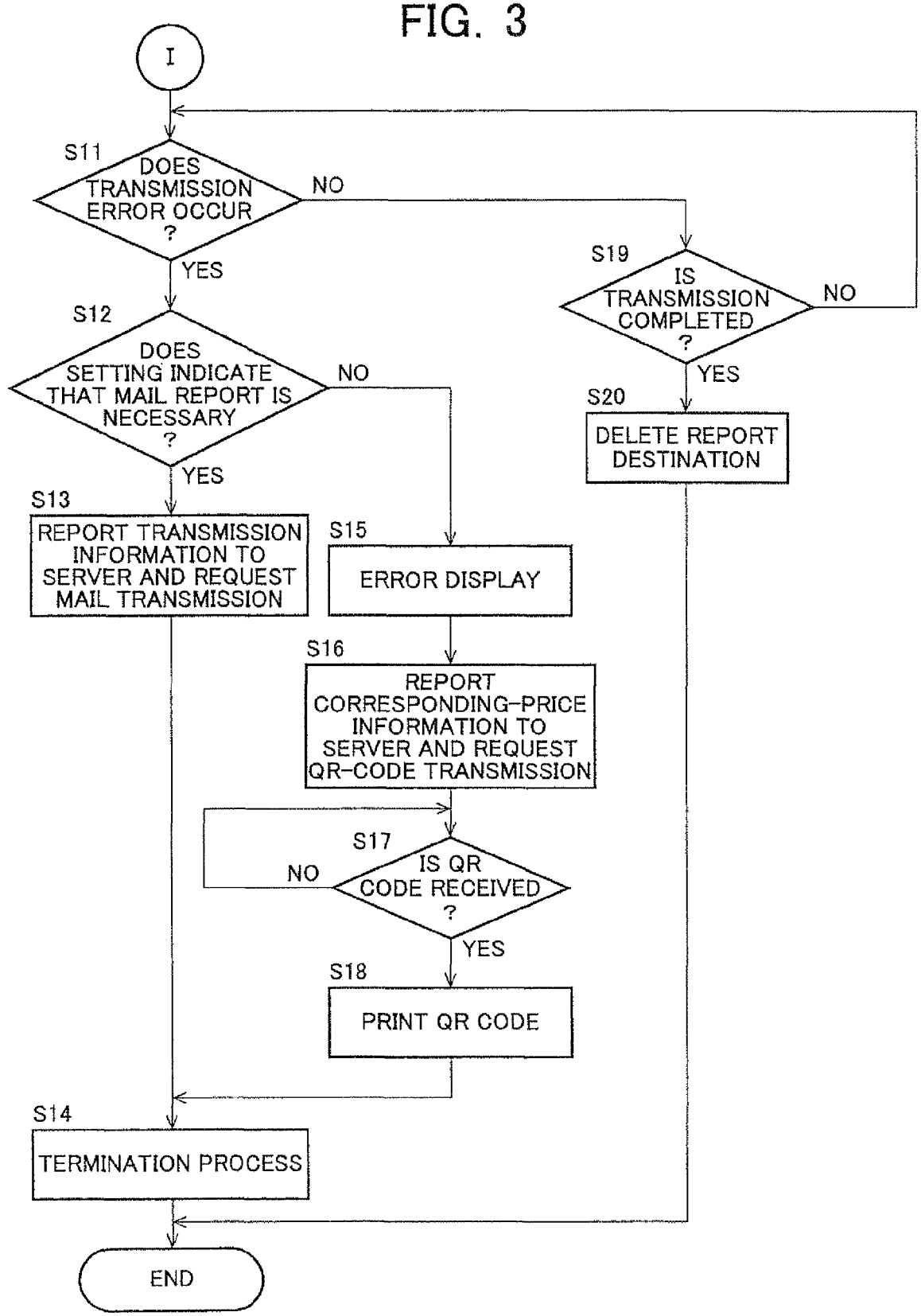
FIG. 3 is a flowchart continued from FIG. 2.
Figure 4:
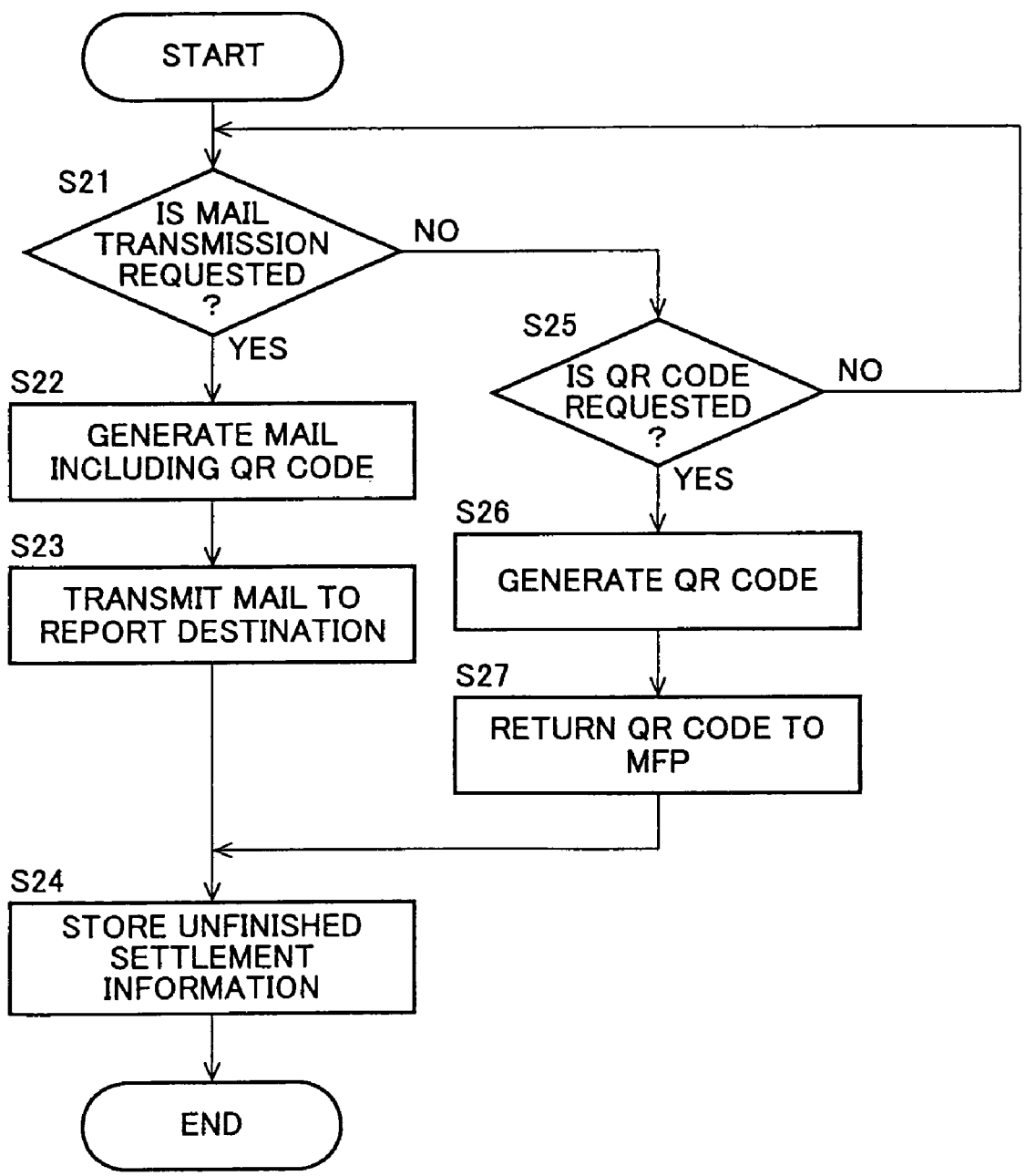
FIG. 4 is a flowchart of an example of a process of a server in the system of FIG. 1.
Figures 7, 8:
FIG. 7 depicts an example of UI displayed on the display/operation panel of the MFP when a communication error occurs while a user is present in front of the MFP in the process of FIG. 3.
FIG. 8 depicts an example of an error mail transmitted from a server to a portable terminal of a user in the process of FIG. 4.
Figures 9, 10:
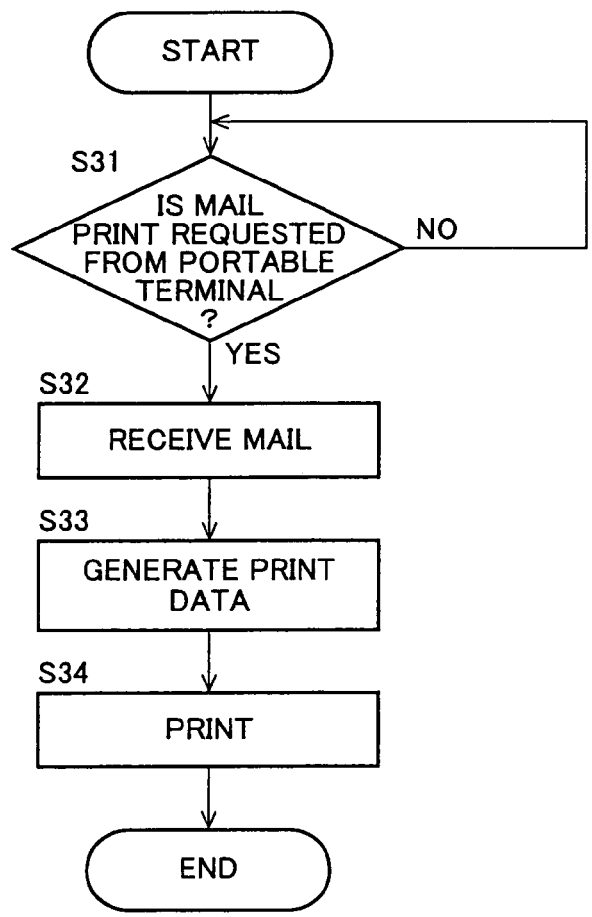
FIG. 9 depicts an example of error information and settlement information managed by the server in the system of FIG. 1.
FIG. 10 is a flowchart of an example of a process of printing an e-mail received from a portable terminal executed by the MFP in the system of FIG. 1.

An example of the process in the above system configuration will briefly be described with reference to FIGS. 2 to 12. FIGS. 2 and 3 are a series of flowcharts of an example of the FAX transmission process executed by the MFP in the system of FIG. 1, and FIG. 4 is a flowchart of an example of a process of the server in the system of FIG. 1. FIGS. 5 and 6 depict an example of a user interface (UI) displayed on the display/operation panel of the MFP in the process of FIG. 2. FIG. 7 depicts an example of the UI displayed on the display/operation panel of the MFP when a communication error is generated while a user is present in front of the MFP in the process of FIG. 3, and FIG. 8 depicts an example of the error mail transmitted from the server to the portable terminal of the user in the process of FIG. 4. FIG. 9 depicts an example of the error information and the settlement information managed by the server in the system of FIG. 1.

First, in the MFP 1, the controlling portion 10 determines whether a FAX transmission request exists (step S1) and the corresponding-price receiving portion 11 determines whether the corresponding price is received (step S2). Only when the corresponding price is received at step S2, the process is continued as follows. Steps S1 and S2 may be in any order.

The report destination input processing portion 10b then displays on the display/operation panel 13 a screen for the user to inquire whether a mail report of a transmission error is necessary, as exemplarily illustrated by UI 41 of FIG. 5 (step S3). The report destination input processing portion 10b accepts selection of necessity from the user, and if the user selects that the mail report is necessary (YES at step S4), the report destination input processing portion 10b displays a mail address input screen on the display/operation panel 13 as exemplarily illustrated by UI 42 of FIG. 6 and accepts a mail address for the report (step S5). In the case of NO at step S4 and after the process of step S5, the scanner 14 starts scanning a transmission document and the FAX transmitting/receiving portion 12 executes transmission of image data after the scanning (step S6).

During the FAX transmission at step S6, the FAX transmission error detecting portion 10a monitors whether a transmission error (communication error) occurs (step S11). If the occurrence of an error is detected at step S11, the setting result at step S4 is read to determine whether the setting indicates that the mail report is necessary (step S12). If the mail report has been set to be necessary at step S12, the transmission information transmission processing portion 10c reports the transmission information (the mail address and the corresponding-price information of the FAX transmission) to the server 3 through the network I/F 17 to make a mail transmission request (step S13). After step S13, the FAX transmitting/receiving portion 12 executes the termination process of the FAX transmission (step S14) to terminate the FAX transmission process.

If the mail report has been set to be not necessary at step S12, the controlling portion 10 displays an error report screen on the display/operation panel 13 as exemplarily illustrated by UI 43 of FIG. 7 (step S15). At an appropriate time, such as when a user presses down OK on the UI 43, the QR code print processing portion 10d reports the corresponding-price information to the server 3 to make a QR code transmission request (step S16) and waits a response of a QR code from the server 3 (step S17). When receiving the QR code from the server 3 through the network I/F 17 (YES at step S17), the QR code print processing portion 10d drives the printing portion 15 to print the QR code (step S18). The QR code handled at steps S16 to S18 may have a fixed phrase added (e.g., the same contents as the error mail exemplarily illustrated in FIG. 8) or may have only a QR code. After step S18, the FAX transmitting/receiving portion 12 executes the termination process of the FAX transmission (step S14) to terminate the FAX transmission process.

On the other hand, if no error is detected at step S11, the FAX transmitting/receiving portion 12 determines whether the transmission is completed (step S19), deletes the report destination mail address which becomes unnecessary at the time of completion (step S20), and terminates the process. It is preferable that the MFP 1 includes a report destination erasing portion that automatically erases the report destination input by the report destination input processing portion 10b as in step S20 when the FAX transmission is completed without a communication error detected by the FAX transmission error detecting portion 10a.

Preferably, when the error mail including the QR code is transmitted from the server 3 after the FAX transmission error detecting portion 10a detects a communication error, the report destination erasing portion also automatically erases the report destination input by the report destination input processing portion 10b. Of course, when the mail transmission request is transmitted at step S13, it may be considered that the error mail is transmitted and the report destination may be erased.

In the server 3, the transmission information reception processing portion 30a waits to receive the mail transmission request or the QR code transmission request (steps S21 and S25). If the transmission information reception processing portion 30a receives the mail transmission request of step S13 (YES at step S21), the received transmission information is stored as the error information 31a in the storage portion 31, and the error mail generating portion 30b generates an error mail including the QR code from the error information 31a (step S22). The error mail generated here may have contents such as those of an error mail 44 of FIG. 8 and should include at least a QR code corresponding to the refund amount. The stored error information 31a should include a corresponding price of the FAX transmission having a communication error and a report destination mail address specified by a sender as exemplarily illustrated by data 45 of FIG. 9.

The error mail transmission processing portion 30c then transmits the error mail through the network I/F 32 to the report destination mail address included in the error information 31a (step S23). The error information 31a corresponding to the mail transmission is then correlated with the settlement information 31b (unfinished-settlement information indicating unfinished settlement at this point) and stored in the storage portion 31 (step S24) to terminate the process. At step S24, the information related to the QR code generated at step S22 is also correlated and stored as a part of the settlement information 31b. Therefore, a response can be made to the check request from the settling apparatus 2 (or the MFP 1).

If the transmission information reception processing portion 30a receives the QR code transmission request of step S16 (YES at step S25), the received corresponding-price information is stored as the error information 31a in the storage portion 31, and the print data generating portion 30d generates print data at least including the QR code based on the corresponding-price information (step S26). The print data are the data for printing the QR code on the MFP 1 side. The print data transmission processing portion 30f then returns the print data to the MFP 1 through the network I/F 32 (step S27). After step S27, the process of step S24 is executed.

The user can receive the error mail including the QR code through the process of step S23 and the user executes the print operation of the error mail with the MFP 1, etc. FIG. 10 is a flowchart of an example of the process of printing the e-mail received from the portable terminal executed by the MFP in the system of FIG. 1. By way of example, the print process will be described for the case that the user executes the print operation with the MFP 1 with reference to FIG. 10.

First, the user establishes the communication with the MFP 1 from the portable terminal through the communication I/F within the portable terminal and the communication I/F 16 of the MFP 1 and transmits the print request of the error mail to the MFP 1 to execute the print operation. In the MFP 1, the error mail print processing portion 10e waits the print request from the portable terminal (step S31) and receives the corresponding error mail if the print request is received (step S32). The error mail print processing portion 10e executes a process of driving the printing portion 15 to print the mail, and the printing portion 15 generates print data (step S33) and performs the printing (step S34).

Figure 11:
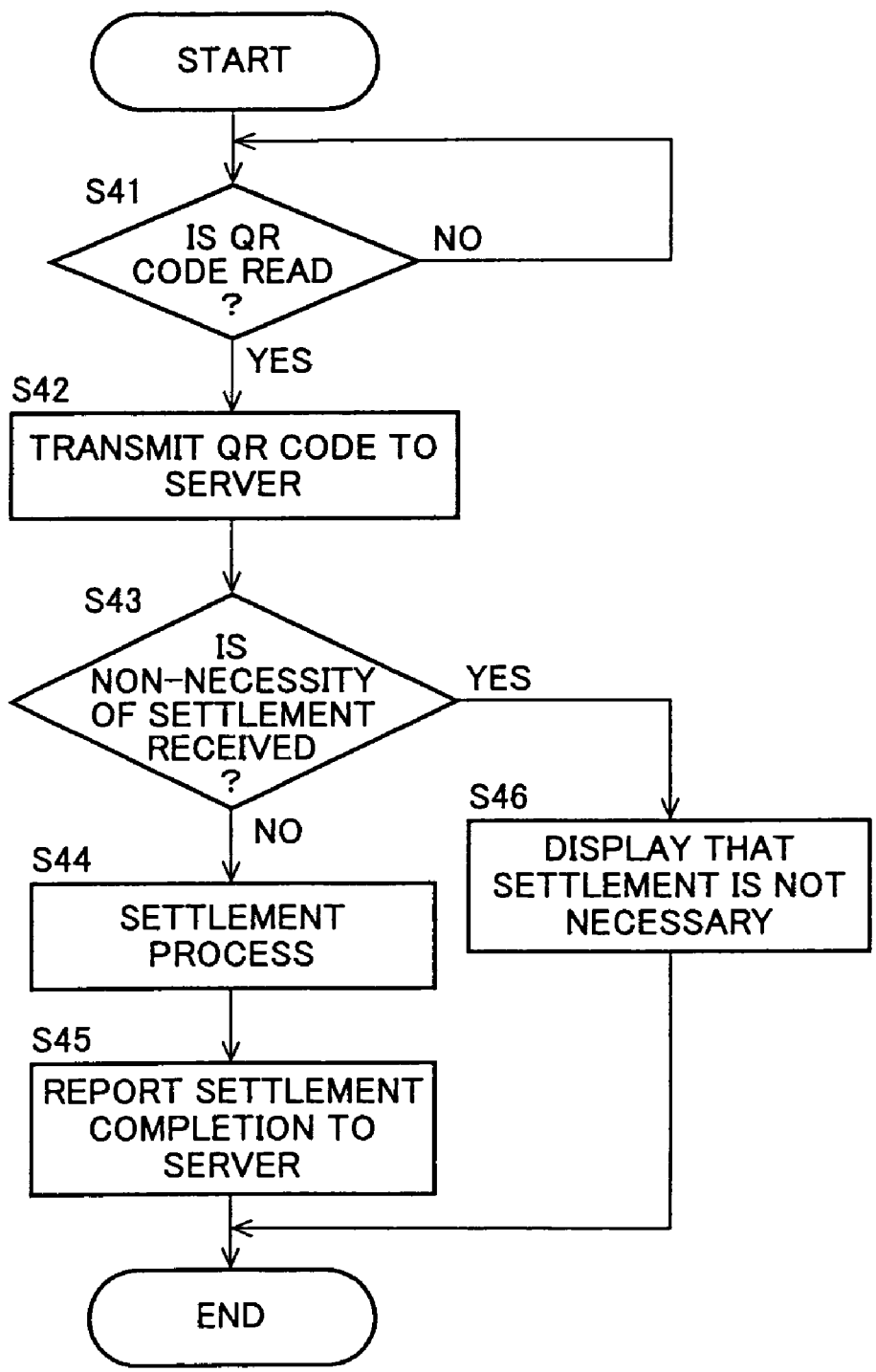
FIG. 11 is a flowchart of an example of a settlement process executed by a settling apparatus in the system of FIG. 1.
Figure 12:
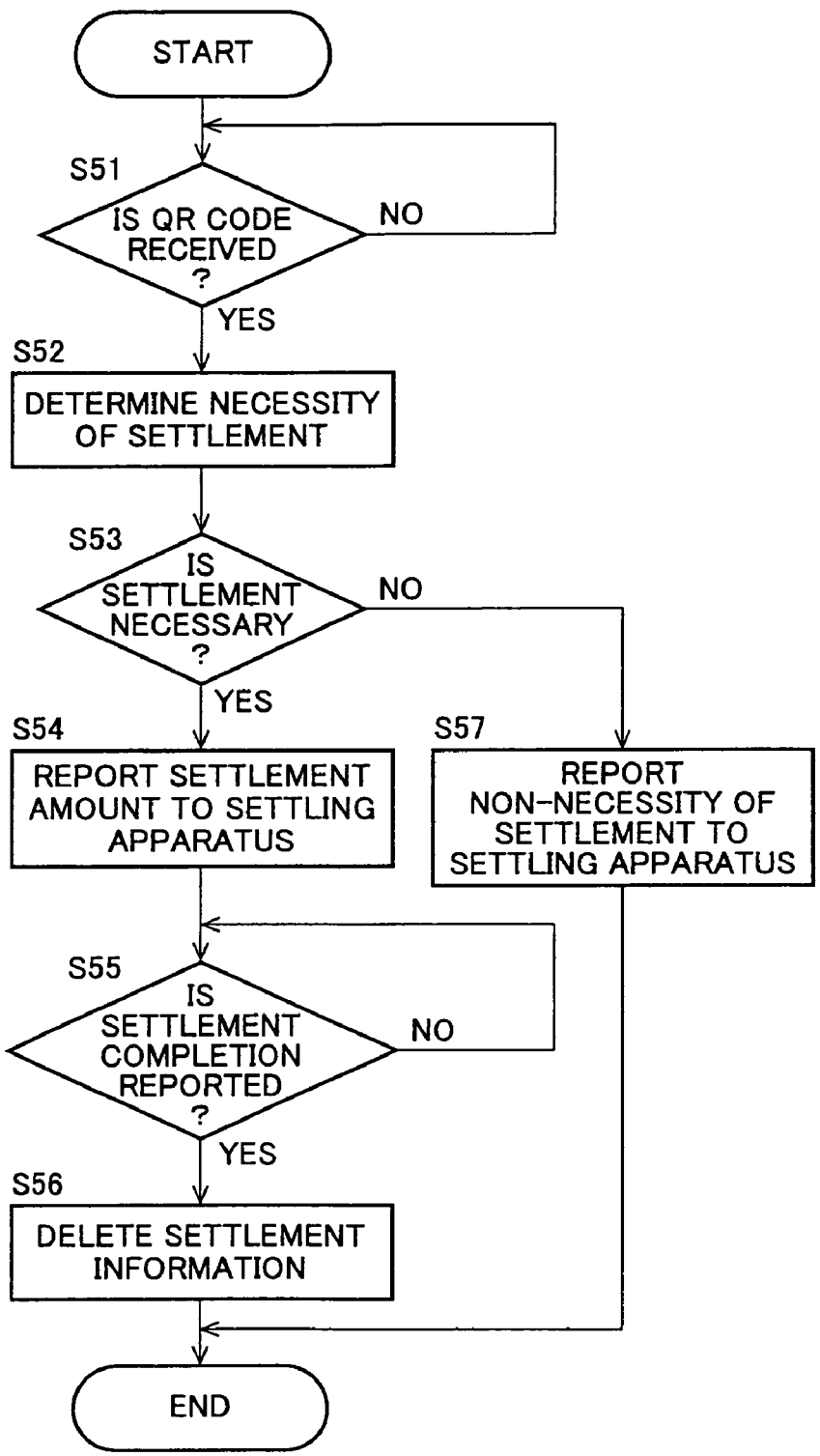
FIG. 12 is a flowchart of an example of a checking process executed by the server in response to the settlement process of FIG. 11.

The QR code is printed in the print process at step S34 or at the response process at step S27. The refund process (settlement process) using the QR code will briefly be described with reference to FIGS. 11 and 12. FIG. 11 is a flowchart of an example of the settlement process executed by the settling apparatus in the system of FIG. 1, and FIG. 12 is a flowchart of an example of the checking process executed by the server in response to the settlement process of FIG. 11.

The settlement process is started by the user passing the printed QR code (or information including the QR code) to a store clerk. The store clerk causes the QR code to be read by the QR code reading portion 21 of the settling apparatus 2 (in this example, the cash register apparatus). The settlement processing portion 20a of the settling apparatus 2 monitors the reading of the QR code (step S41) and transmits the QR code (or information indicated by the QR code) to the server 3 when the reading is detected (step S42). This transmission is mainly for the purpose of checking the QR code and is performed by the refund validity checking portion 20b.

In the server 3, the settlement necessity determining portion 30f monitors the reception of the QR code (step S51) and, if received, the necessity of the settlement is determined by reference to the settlement information 31b (step S52). As a result of the determination, if the settlement is necessary (YES at step S53), the settlement necessity determining portion 30f reports the settlement amount to the settling apparatus 2 (step S54). On the other hand, if the settlement is not necessary, (NO at step S53), a report is made to the settling apparatus 2 to indicate that the settlement is not necessary (step S57) and the process is terminated.

The refund validity checking portion 20b of the settling apparatus 2 waits the report of step S54 or S57 to determine whether the report indicates that the settlement is not necessary or that the settlement is necessary (step S43). In the former case, the refund validity checking portion 20b performs display indicating that the settlement cannot be executed or that no corresponding settlement information exists to notify the user (step S46).

On the other hand, if the received response indicates that the settlement is necessary, the settlement processing portion 20a executes the settlement process (step S44). This settlement process includes a process of displaying a returned settlement amount and a store clerk may refund the settlement amount to the user. The refund completion reporting portion 20c transmits the refund completion report for the QR code of the settlement process completed at step S44 to the server 3 through the network I/F 22 (step S45) and the process is terminated.

In the server 3, after step S54, the refund managing portion 30g waits the refund completion report (step S55), and when the refund completion report is received, the corresponding settlement information 31b is rewritten to the finished settlement or is erased (step S56). As described above, the rewrite or erasure of the settlement information 31b may be performed when it is determined that the settlement is necessary at step S53.

Although the description has been made on the premise that the settling apparatus 2 is the cash register apparatus, an exemplary configuration having the settling apparatus 2 built into the MFP 1 will then be described. For simplicity, the description will be made only of differences from the case that the settling apparatus 2 is the cash register apparatus.

First, the above refund information input portion does not include the QR code reading portion 21, and an image reading portion such as scanner 14 included in the MFP 1 may be used instead. The scanner 14 may optically read an image on the sheet with the QR code printed to deliver the image to the settlement processing portion 20a also included in the MFP 1.

Although the corresponding-price receiving portion 11 may similarly be made up of a money input/output apparatus, the settlement processing portion 20a may include a refunding portion that uses this money input/output apparatus to output money of an amount indicated by the QR code. Therefore, the refund process does not have to be performed with the cash register apparatus in a store and the burden is reduced for store clerks. Alternatively, the settlement processing portion 20a may transmit an instruction for the settlement process of the money amount indicated by the QR code to the cash register apparatus connected to the MFP 1 and disposed in the vicinity thereof.

Figure 14A:
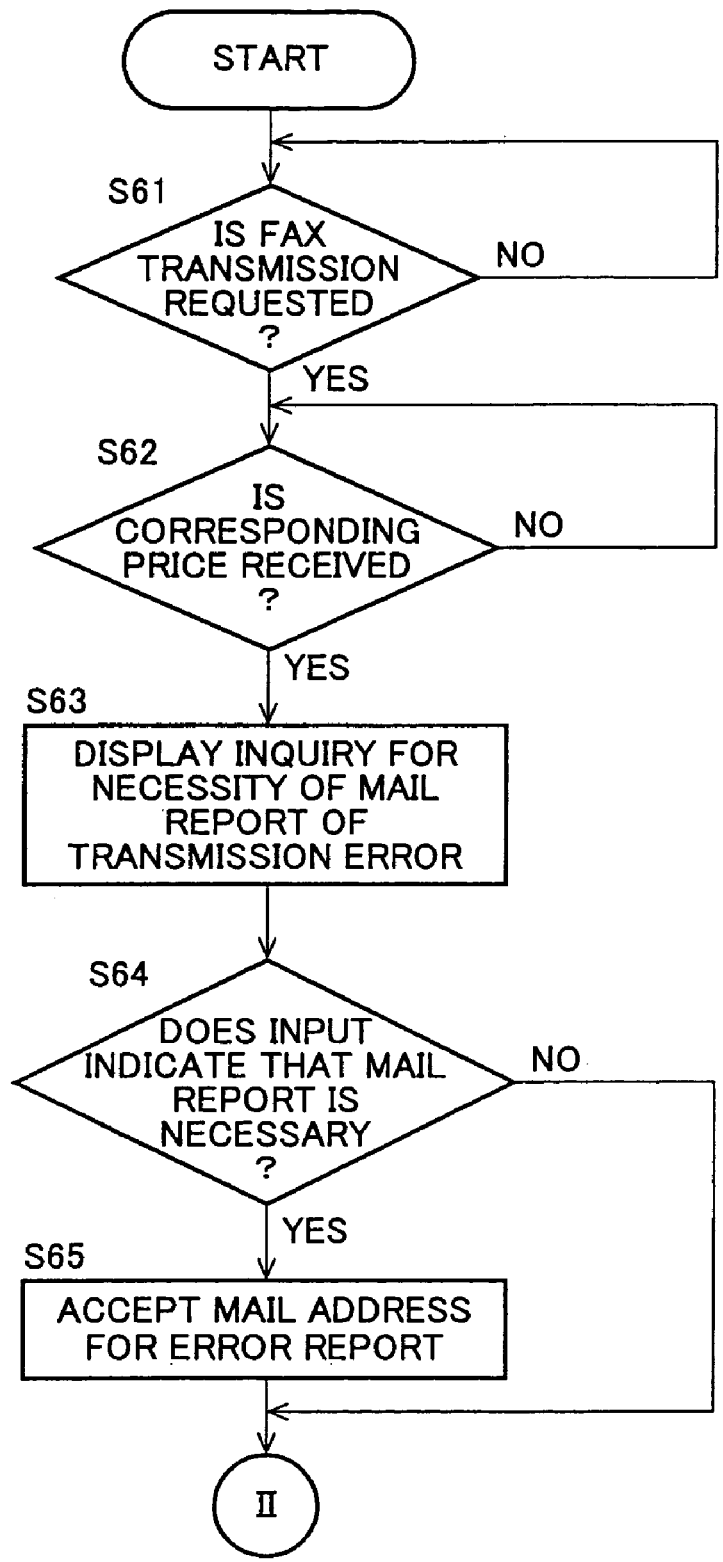
FIGS. 14A and 14B are flowcharts of an example of the FAX transmission process executed by the MFP in the system of FIG. 13.
Figure 14B:
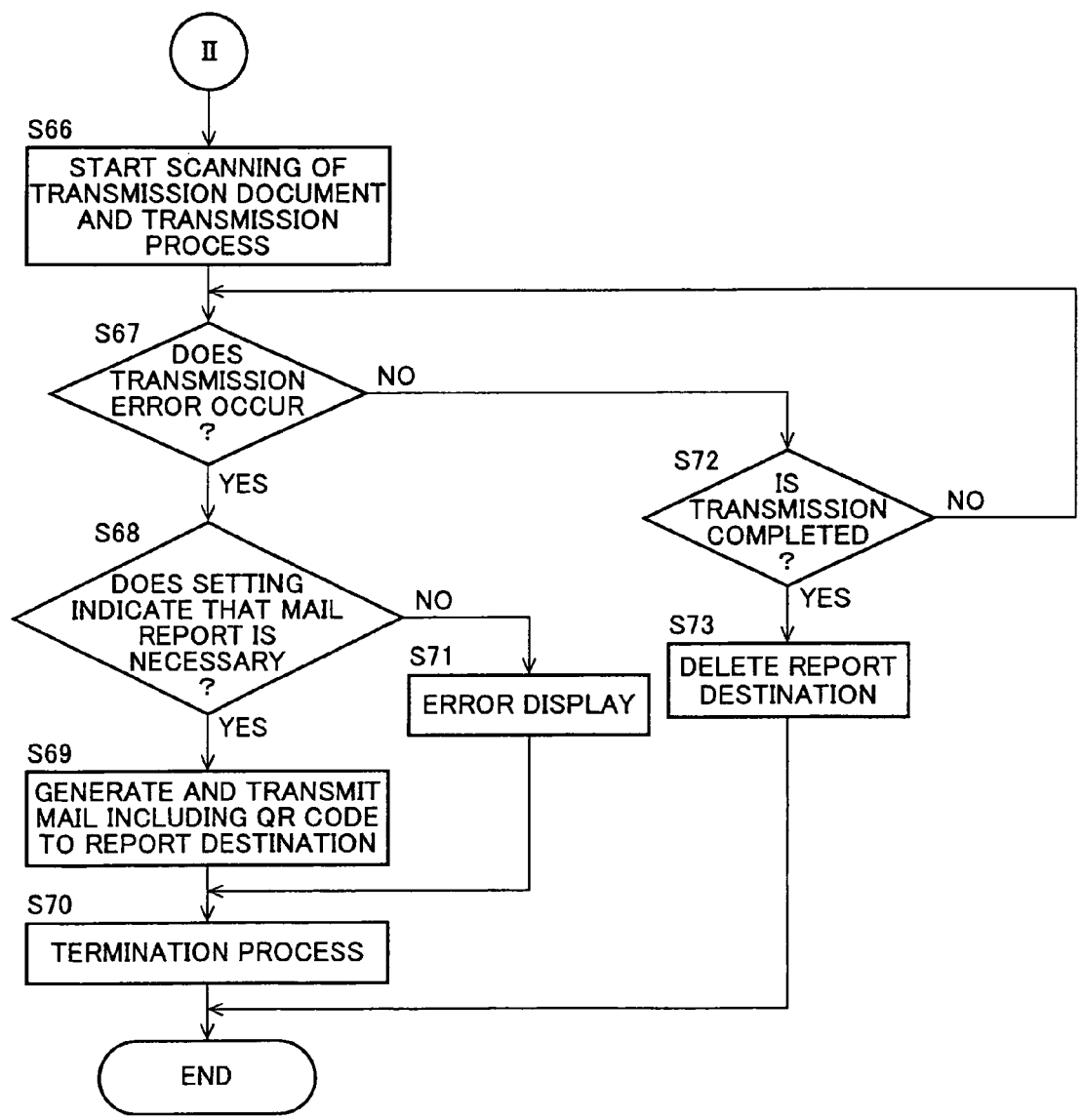

An exemplary system configuration will then be described that enables the independent process of the MFP without using the server with reference to FIGS. 13, 14A and 14B. FIG. 13 depicts an exemplary configuration of the FAX transmission system according to another embodiment of the present invention, and in FIG. 13, a reference numeral 6 denotes an MFP disposed in a store A and 7 denotes a settling apparatus disposed in the store A. FIGS. 14A and 14B are flowcharts of an example of the FAX transmission process executed by the MFP in the system of FIG. 13.

In the exemplary configuration illustrated in FIG. 13, the above refund information transmitting portion is not made up of the transmission information transmitting portion of the MFP 1 and the transmission information receiving portion and the transmitting portion of the server 3 of FIG. 1 and the MFP 6 itself is equipped with all the portions as shown in FIG. 13. That is, the MFP 6 includes a controlling portion 60 that generally controls the MFP 6 as a whole, a corresponding-price receiving portion (corresponding-price collecting portion) 61, a FAX transmitting/receiving portion 62, a display/operation panel 63, a scanner portion 64, a printing portion 65, a portable-terminal communication I/F 66, and a network I/F 67. The MFP 6 is different from the MFP 1 mainly in the controlling portion 60. The controlling portion 60 includes a FAX transmission error detecting portion 60a, a report destination input processing portion 60b, an error mail generating portion 60c, an error mail transmission processing portion 60d, and an error mail print processing portion 60e and performs the FAX transmission control including the control at the time of communication error according to the present invention.

The FAX transmission error detecting portion 60a and the report destination input processing portion 60b are the same as the FAX transmission error detecting portion 10a and the report destination input processing portion 10b, respectively. In this exemplary configuration, the refund information transmitting portion can exemplarily be illustrated by the error mail generating portion 60c and the error mail transmission processing portion 60d. If the FAX transmission error detecting portion 60a detects a communication error, the error mail generating portion 60c generates an error mail having a QR code as is the case with the error mail generating portion 30b of FIG. 1 based on the corresponding price of the FAX transmission with the communication error. The error mail transmission processing portion 60d transmits the error mail through the network I/F 67 to the mail address input through the report destination input processing portion 60b.

The settling apparatus 7 executes the refund process without exchanging with the server, unlike the settling apparatus 2. The settling apparatus 7 includes a QR code reading portion 71 similar to the QR code reading portion 21 and a controlling portion 70 including a settlement processing portion 70a. The settlement processing portion 70a analyzes the QR code read by the QR code reading portion 71 to execute the refund process of the price corresponding to the QR code. Although the settling apparatus 7 may be made up of a cash register apparatus or an exemplary configuration built into the MFP 6 may be employed as is the case with the settling apparatus 2, the case of employing the former will be described.

An example of the FAX transmission process in the exemplary configuration as shown in FIG. 13 will briefly be described. As with steps S1 to S6 and S11 of FIG. 2, the FAX transmission is started and the detection of a communication error is performed (steps S61 to S66 and S67). If a communication error is detected, it is determined whether the mail report is necessary as with step S12 (step S68).

If the report is necessary at step S68, the error mail generating portion 60c generates an error mail having a QR code based on the corresponding price of the FAX transmission with the communication error, and the error mail transmission processing portion 60d transmits the error mail through the network I/F 67 to the mail address input through the report destination input processing portion 60b (step S69). The FAX transmitting/receiving portion 62 then executes the termination process of the FAX transmission (step S70) to terminate the FAX transmission process.

After the transmission at step S69, a user drives the MFP 6 to print the QR code as exemplarily illustrated in FIG. 10. Subsequently, the settlement process is executed by reading this QR code with the settling apparatus 7. To prevent counterfeiting of the QR code, the settling apparatus 7 may store the information of the QR codes issued by the MFP 6 and the information indicating whether settlement is finished and may compare these pieces of information at the time of the settlement process.

On the other hand, if the report is not necessary at step S68, an error is displayed as with step S15 (step S71) and the flow goes to step S70. If no communication error occurs at step S67, the report destination is deleted after waiting the completion of the transmission as with steps S19 and S20 (steps S72 and S73).

Although the MFP 6 can independently execute the process when a communication error occurs in the exemplary configuration described in FIGS. 13, 14A and 14B, the refund process due to communication errors occurring in MFPs of affiliated stores cannot be performed. Therefore, to enable support of affiliated stores, it is desirable that a management server apparatus (server) is provided to share the information about refunds among MFPs in affiliated stores as exemplarily illustrated in FIGS. 15, 16A and 16B.

Figure 15:
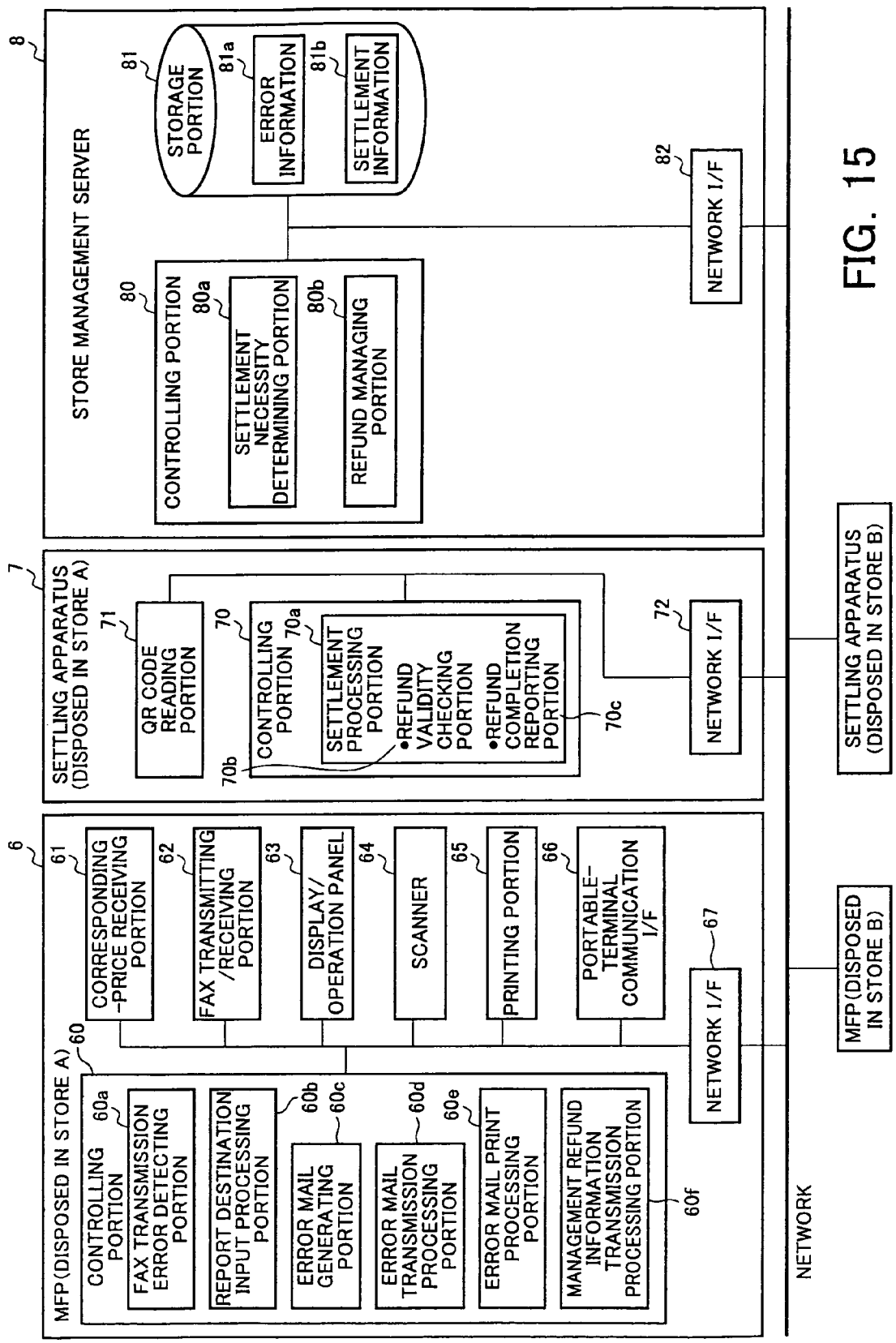
FIG. 15 depicts an exemplary configuration of the FAX transmission system according to another embodiment of the present invention.
Figure 16A:
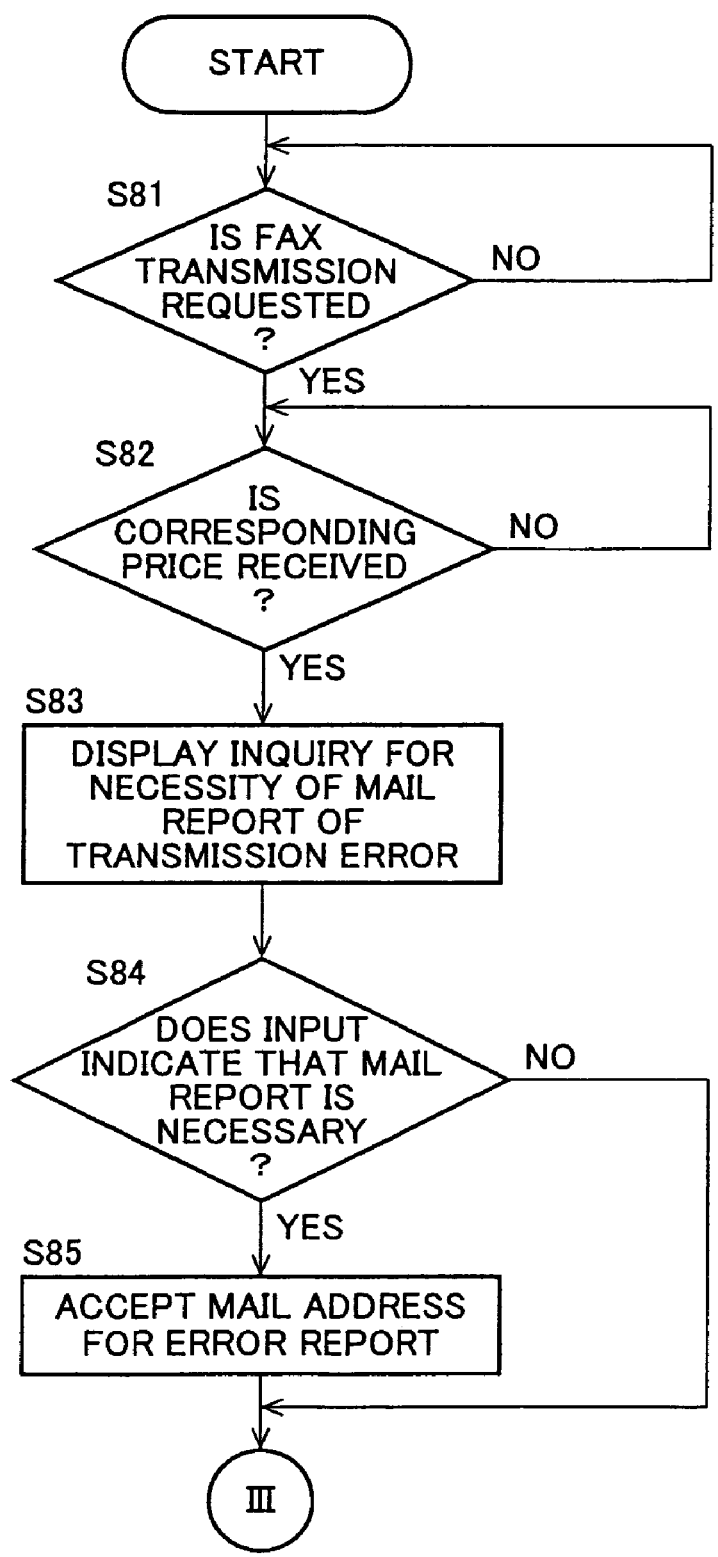
FIGS. 16A and 16B are flowcharts of an example of the FAX transmission process executed by the MFP in the system of FIG. 15.
Figure 16B:
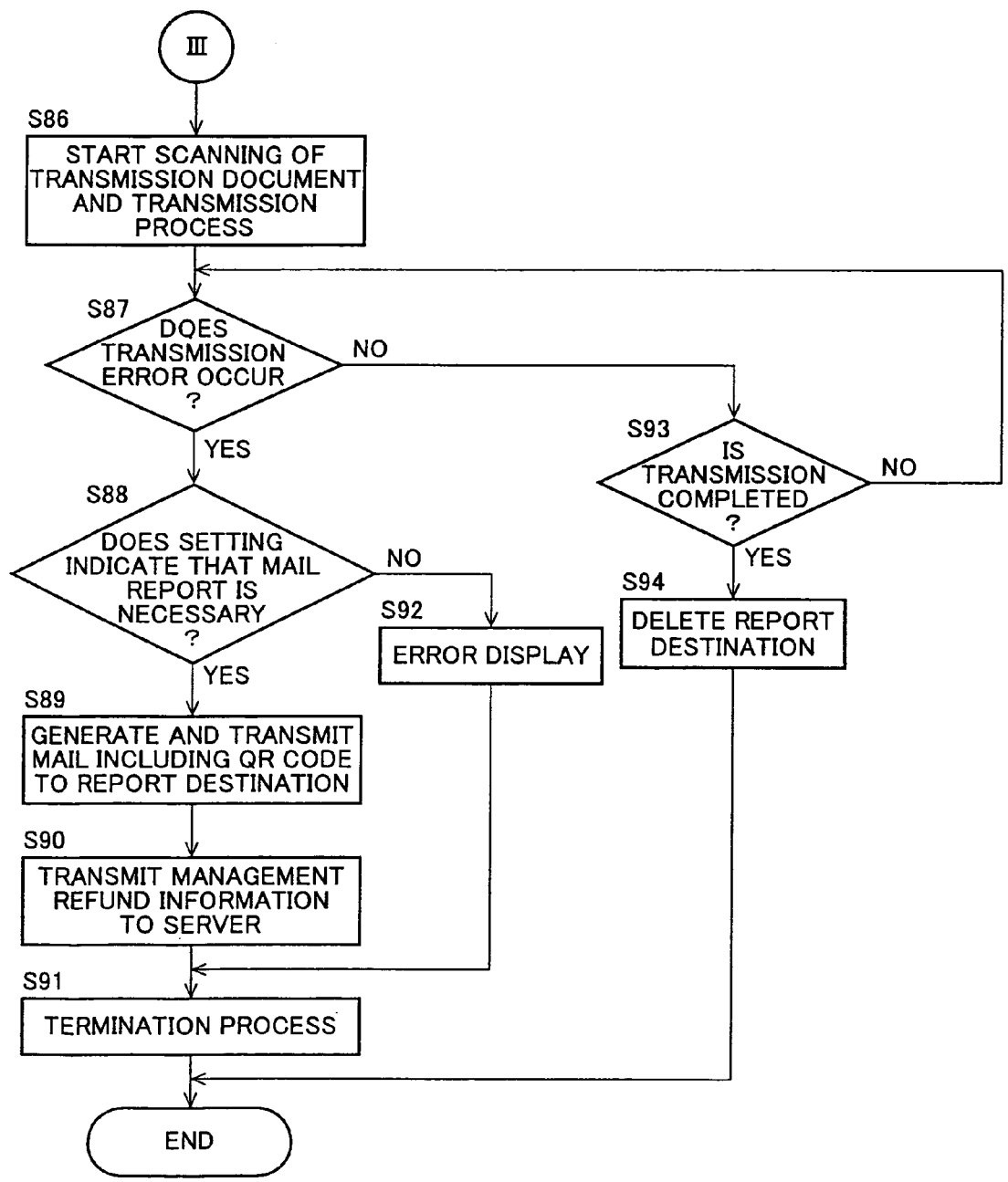

FIG. 15 depicts an exemplary configuration of the FAX transmission system according to another embodiment of the present invention, and in FIG. 15, a reference numeral 6 denotes an MFP disposed in a store A; 7 denotes a settling apparatus disposed in the store A; and 8 denotes a management server apparatus (store management server). FIGS. 16A and 16B are flowcharts of an example of the FAX transmission process executed by the MFP in the system of FIG. 15.

The exemplary configuration illustrated in FIG. 15 includes the server 8 connected through a network to the MFP 6. The server 8 includes a controlling portion 80 that has a check result returning portion (exemplarily illustrated as a settlement necessity determining portion 80a) and a refund managing portion 80b, a storage portion 81 that has error information 81a and settlement information 81b stored thereon, and a network I/F 82. The settlement necessity determining portion 80a, the refund managing portion 80b, the storage portion 81, and the network I/F 82 are the same as the settlement necessity determining portion 30f, the refund managing portion 30g, the storage portion 31, and the network I/F 32 of FIG. 1, respectively. However, since the transmission of the error mail is performed by the MFP 6 as is the case with the exemplary configuration of FIG. 13, the report destination (mail address) is unnecessary for handled information.

In the above refund information transmitting portion, the MFP 6 itself is equipped with all the portions as with FIG. 13, and the MFP 6 of FIG. 15 is the same as the MFP 6 of FIG. 13 with a management refund information transmission processing portion 60f in the controlling portion 60. The management refund information transmission processing portion 60f transmits through the network I/F 67 to the server 8 the management refund information including the QR code transmitted by the error mail transmission processing portion 60d.

The refund managing portion 80b receives the management refund information transmitted by the management refund information transmission processing portion 60f and manages the QR codes of uncompleted refunds based on the management refund information and the QR codes included in the check requests from a refund validity checking portion 70b. The settlement necessity determining portion 80a checks whether a refund should be made for the information based on whether the QR code included in the check request from the refund validity checking portion 70b is the QR code of uncompleted refund managed in the refund managing portion 80g (and checks a refund amount) to return the result to the settling apparatus 7.

The settling apparatus 7 of FIG. 15 includes the refund validity checking portion 70b and a refund completion reporting portion 70c in the settlement processing portion 70a as is the case with the settling apparatus 2 of FIG. 1. In the settling apparatus 7, the QR code reading portion 71 reads the QR code, and the refund validity checking portion 70b and the refund completion reporting portion 70c in the settlement processing portion 70a execute the refund process while interacting with the server 8. Although the settling apparatus 7 may be made up of a cash register apparatus or an exemplary configuration built into the MFP 6 may be employed as is the case with the settling apparatus 2, the case of employing the former is described.

The refund managing portion 80*b* may receive the refund completion report transmitted by the refund completion reporting portion 70*c* to manage the QR code of uncompleted refund based on the management refund information and the refund completion report instead of the management refund information and the QR code included in the check request.

An example of the FAX transmission process in the exemplary configuration as shown in FIG. 15 will briefly be described. Although the MFP 6 also executes the FAX transmission process same as steps S61 to S73 of FIGS. 14A and 14B (steps S81 to S89, S91 to S94), subsequently to the transmission of the error mail including the QR code (step S89), the management refund information transmission processing portion 60*f* transmits the management refund information through the network I/F 67 to the server 8 (step S90).

After the transmission at step S89, the user causes the MFP 6 to print the QR code as exemplarily illustrated in FIG. 10. The settlement process is then executed in conjunction with the server 8 by reading the QR code with the settling apparatus 7. The settling apparatus 7 and the server 8 execute the process same as that exemplarily illustrated in FIGS. 11 and 12.

The QR code generated by the error mail generating portion 60*c* and transmitted by the error mail transmission processing portion 60*d* may include apparatus identification information identifying the MFP 6. By including the apparatus identification information, the management in the refund managing portion 80*b* can include the management of failures in the FAX transmitting/receiving portion 62 of each MFP, for example.

By including the apparatus identification information in the QR code, the refund validity checking portion 70*b* can transmit the above check request to the server 8 based on the apparatus identification information only when the QR code read by the QR code reading portion 71 is not generated due to a communication error of its own (in this case, the MFP 6) but another MFP.

Although the embodiments of the system have been described with reference to FIGS. 1 to 16B, the present invention may take the form of a data transmitting method in this system as described in the process flows thereof.

The present invention may take the form of programs incorporated into the data transmitting apparatus exemplarily illustrated by the MFP, the management server apparatus, and the settling apparatus. These programs have exemplarily been illustrated as control programs in the controlling portions of the apparatuses. These programs can be distributed as a computer-readable recording medium having the programs recorded thereon or delivered through a network and can executably be incorporated into the corresponding apparatus (any one of the data transmitting apparatus, the management server apparatus, and the settling apparatus).

According to the present invention, when a data transmitting apparatus performs data transmission and collects a corresponding price, a user is enabled to move away before the completion of the data transmission regardless of whether a refund is made in association with occurrence of a communication error. Since the data transmitting apparatus is occupied by a user for a shorter time and the next user can use the data transmitting apparatus, the operation rate of the apparatus can be increased.

The invention claimed is:

1. A data transmission system, comprising:
 a data transmitting apparatus including a data transmitting portion that transmits data, a money input/output apparatus that receives a payment amount in the form of money or other payment inserted into the money input/output apparatus from a user in consideration of data transmission by the data transmitting portion, a report destination input portion that enables the user to input a report destination via an operation panel, and an error detecting portion that detects a communication error at the time of the data transmission by the data transmitting portion;
 a settling apparatus operably connected to the data transmitting apparatus, the settling apparatus including at least a controlling portion for issuing a refund in the event that the error detecting portion of the data transmitting apparatus detects the communication error; and
 a management server apparatus operably connected to the settling apparatus, the server configured to manage issuance of the refund in the event of the communication error,
 the data transmission system including a refund information transmitting portion of the management server apparatus that transmits refund information in the form of a QR code for refunding the payment amount to the user at the report destination input by the user in case the communication error is detected by the error detecting portion, so as to enable the user to obtain the refund by presenting the QR code at the settling apparatus.

2. The data transmission system as defined in claim 1, wherein the refund information transmitting portion includes on the data transmitting apparatus side a transmission information transmitting portion that transmits to the management server apparatus transmission information including the report destination input by the report destination input portion and the payment amount received by the price receiving portion and includes on the management server apparatus side a transmission information receiving portion that receives the transmission information and a transmitting portion that transmits the refund information for refunding the payment amount for the data transmission with the communication error to the report destination included in the transmission information received by the transmission information receiving portion.

3. The data transmission system as defined in claim 2, wherein the data transmitting apparatus includes a refund information input portion that inputs the refund information transmitted by the refund information transmitting portion or information including the refund information; and a settling portion that executes a settlement process of a money amount indicated by the refund information input by the refund information input portion.

4. The data transmission system as defined in claim 3, wherein
 the settling portion includes a refund validity checking portion that transmits to the management server apparatus a check request for checking whether the refund information input by the refund information input portion is information that should cause the refund, or a check request for said check and for checking the money amount indicated by the refund information, to acquire result thereof and executes the settlement process based on the result only when a refund should be made, and
 wherein
 the management server apparatus includes a refund managing portion that manages the refund information of an uncompleted refund based on the transmission information received by the transmission information receiving portion and the refund information included in the check request from the refund validity checking portion; and a check result returning portion that checks whether information should cause the refund based on whether the refund information included in the check request from the refund validity checking portion is the refund information of the uncompleted refund managed by the refund managing portion, or that checks the money amount indicated by the refund information included in the check request in addition to said check, to return the result thereof to the data transmitting apparatus.

5. The data transmission system as defined in claim 4, wherein
the data transmitting apparatus includes a refund completion reporting portion that transmits to the management server apparatus a refund completion report for the refund information of the settlement process completed by the settling portion, and wherein
the refund managing portion receives the refund completion report transmitted by the refund completion reporting portion to manage the refund information of the uncompleted refund based on the transmission information and the refund completion report instead of the transmission information and the refund information included in the check request.

6. The data transmission system as defined in claim 1, comprising the management server apparatus connected to the data transmitting apparatus through a network, wherein
the refund information transmitting portion is on the data transmitting apparatus side, and wherein
the data transmitting apparatus includes a refund information input portion that inputs the refund information transmitted by the refund information transmitting portion or information including the refund information; and a settling portion that executes a settlement process of a money amount indicated by the refund information input by the refund information input portion.

7. The data transmission system as defined in claim 6, wherein
the data transmitting apparatus includes a management refund information transmitting portion that transmits to the management server apparatus management refund information including the refund information transmitted by the refund information transmitting portion, wherein
the settling portion includes a refund validity checking portion that transmits to the management server apparatus a check request for checking whether the refund information input by the refund information input portion is information that should cause the refund, or a check request for said check and for checking the money amount indicated by the refund information, to acquire result thereof and executes the settlement process based on the result only when the refund should be made, and wherein
the management server apparatus includes a refund managing portion that receives the management refund information transmitted by the management refund information transmitting portion to manage the refund information of uncompleted refund based on the management refund information and the refund information included in the check request from the refund validity checking portion; and a check result returning portion that checks whether information should cause the refund based on whether the refund information included in the check request from the refund validity checking portion is the refund information of an uncompleted refund managed by the refund managing portion, or that checks the money amount indicated by the refund information included in the check request in addition to said check, to return the result thereof to the data transmitting apparatus.

8. The data transmission system as defined in claim 7, wherein
the data transmitting apparatus includes a refund completion reporting portion that transmits to the management server apparatus a refund completion report for the refund information of the settlement process completed by the settling portion, and wherein
the refund managing portion receives the refund completion report transmitted by the refund completion reporting portion to manage the refund information of the uncompleted refund based on the management refund information and the refund completion report instead of the management refund information and the refund information included in the check request.

9. The data transmission system as defined in claim 7, wherein
the refund information transmitted by the refund information transmitting portion includes apparatus identification information that identifies the data transmitting apparatus, and wherein
based on the apparatus identification information, the refund validity checking portion transmits the check request to the management server apparatus only when the refund information input by the refund information input portion is generated due to the communication error of another data transmitting apparatus.

10. The data transmission system as defined in claim 3, wherein the refund information input portion includes an image reading portion that optically reads an image on a sheet having printed thereon the refund information transmitted by the refund information transmitting portion.

11. The data transmission system as defined in claim 3, wherein the price receiving portion includes a money input/output apparatus inputting money and outputting money of a change if the input money amount exceeds the payment amount, and wherein the settling portion includes a refunding portion using the money input/output apparatus to output money of an amount indicated by the refund information.

12. The data transmission system as defined in claim 3, wherein the settling portion transmits an instruction for a settlement process of a money amount indicated by the refund information to a cash register apparatus connected to the data transmitting apparatus and disposed in a vicinity thereof.

13. The data transmission system as defined in claim 2, comprising a cash register apparatus connected to the management server apparatus and disposed in a vicinity of the data transmitting apparatus, wherein
the cash register apparatus includes a refund information input portion that inputs the refund information transmitted by the refund information transmitting portion or information including the refund information; and a settling portion that executes a settlement process of a money amount indicated by the refund information input by the refund information input portion, wherein
the settling portion includes a refund validity checking portion that transmits to the management server apparatus a check request for checking whether the refund information input by the refund information input portion is information that should cause a refund, or a check request for said check and for checking the money amount indicated by the refund information, to acquire result thereof and executes the settlement process based on the result only when the refund should be made, and wherein the management server apparatus includes a refund managing portion that manages the refund information of an uncompleted refund based on the transmission information received by the transmission information receiving portion and the refund information included in the check request from the refund validity checking portion; and a check result returning portion that checks whether information should cause the refund based on whether the refund information included in the check request from the refund validity checking portion is the refund information of uncompleted refund managed by the refund managing portion, or that checks the money amount indicated by the refund information included in the check request in addition to said check, to return the result thereof to the cash register apparatus.

14. The data transmission system as defined in claim 13, wherein the cash register apparatus includes a refund completion reporting portion that transmits to the management server apparatus a refund completion report for the refund information of the settlement process completed by the settling portion, and wherein the refund managing portion receives the refund completion report transmitted by the refund completion reporting portion to manage the refund information of the uncompleted refund based on the transmission information and the refund completion report instead of the transmission information and the refund information included in the check request.

15. The data transmission system as defined in claim 1, wherein the management server apparatus is connected to the data transmitting apparatus through a network, and a cash register apparatus is connected to the management server apparatus through the network and disposed in a vicinity of the data transmitting apparatus, wherein the refund information transmitting portion is on the data transmitting apparatus side, wherein the data transmitting apparatus includes a management refund information transmitting portion that transmits to the management server apparatus the management refund information including the refund information transmitted by the refund information transmitting portion, wherein the cash register apparatus includes a refund information input portion that inputs the refund information transmitted by the refund information transmitting portion or information including the refund information; and a settling portion that executes a settlement process of a money amount indicated by the refund information input by the refund information input portion, wherein the settling portion includes a refund validity checking portion that transmits to the management server apparatus a check request for checking whether the refund information input by the refund information input portion is information that should cause the refund, or a check request for said check and for checking the money amount indicated by the refund information, to acquire result thereof and executes the settlement process based on the result only when the refund should be made, and wherein the management server apparatus includes a refund managing portion that receives management refund information transmitted by the management refund information transmitting portion to manage refund information of an uncompleted refund based on the management refund information and the refund information included in the check request from the refund validity checking portion; and a check result returning portion that checks whether information should cause the refund based on whether the refund information included in the check request from the refund validity checking portion is the refund information of the uncompleted refund managed by the refund managing portion, or that checks the money amount indicated by the refund information included in the check request in addition to said check, to return the result thereof to the cash register apparatus.

16. The data transmission system as defined in claim 15, wherein the cash register apparatus includes a refund completion reporting portion that transmits to the management server apparatus a refund completion report for the refund information of the settlement process completed by the settling portion, and wherein the refund managing portion receives the refund completion report transmitted by the refund completion reporting portion to manage the refund information of the uncompleted refund based on the management refund information and the refund completion report instead of the management refund information and the refund information included in the check request.

17. The data transmission system as defined in claim 1, wherein the data transmitting apparatus includes a report destination erasing portion that erases the report destination input by the report destination input portion when the data transmission of the data transmitting portion is completed without the communication error detected by the error detecting portion and when the refund information transmitting portion completes the transmission of the refund information after the error detecting portion detects the communication error.

18. The data transmission system as defined in claim 1, wherein the report destination is an e-mail address and wherein the refund information transmitting portion transmits the refund information to the report destination through an e-mail.

19. The data transmission system as defined in claim 1, wherein the refund information transmitting portion transmits the refund information as a one-dimensional or two-dimensional code to the report destination.

20. The data transmission system as defined in claim 1, wherein the refund information transmitting portion is on the data transmitting apparatus side and wherein the data transmitting apparatus includes a refund information input portion that inputs the refund information transmitted by the refund information transmitting portion or information including the refund information; and a settling portion that executes a settlement process of a money amount indicated by the refund information input by the refund information input portion.

21. A data transmitting method using a data transmitting apparatus capable of data transmission, comprising:

a step of receiving a payment amount by a money input/output apparatus connected to the data transmitting apparatus, the payment amount being in the form of money or other payment received from a user in consideration of data transmission by the data transmitting apparatus;

a report destination input step carried out by the data transmitting apparatus for enabling the user to input a report destination via an operation panel of the data transmitting apparatus;

an error detecting step carried out by the data transmitting apparatus for detecting a communication error by the data transmitting apparatus at the time of the data transmission; and a refund information transmitting step for transmitting refund information for refunding the payment amount to the user at the report destination input by the user during the report destination input step in case the communication error is detected at the error detecting step, wherein the refund information is transmitted to the user in the form of a QR code, the QR code being presented by the user to a settling apparatus that issues a refund in the event that the communication error is detected, and the settling apparatus is operably connected to a management server apparatus that manages issuance of the refund in the event of the communication error.

22. The data transmitting method as defined in claim 21, wherein the refund information transmitting step includes a transmission information transmitting step of transmitting by the data transmitting apparatus to the management server apparatus connected through a network to the data transmitting apparatus transmission information including the report destination input at the report destination input step and the received consideration of data transmission in case the communication error is detected at the error detecting step; a transmission information receiving step of receiving the transmission information with the management server apparatus; and a transmitting step of transmitting by the management server apparatus the refund information for refunding the payment amount in consideration of data transmission with the communication error to the report destination included in the transmission information received at the transmission information receiving step.

23. The data transmitting method as defined in claim 22, comprising a refund information input step of inputting by the data transmitting apparatus the refund information transmitted at the refund information transmitting step or information including the refund information; and a settling step of executing by the data transmitting apparatus a settlement process of a money amount indicated by the refund information input at the refund information input step.

* * * * *